Figure 1:
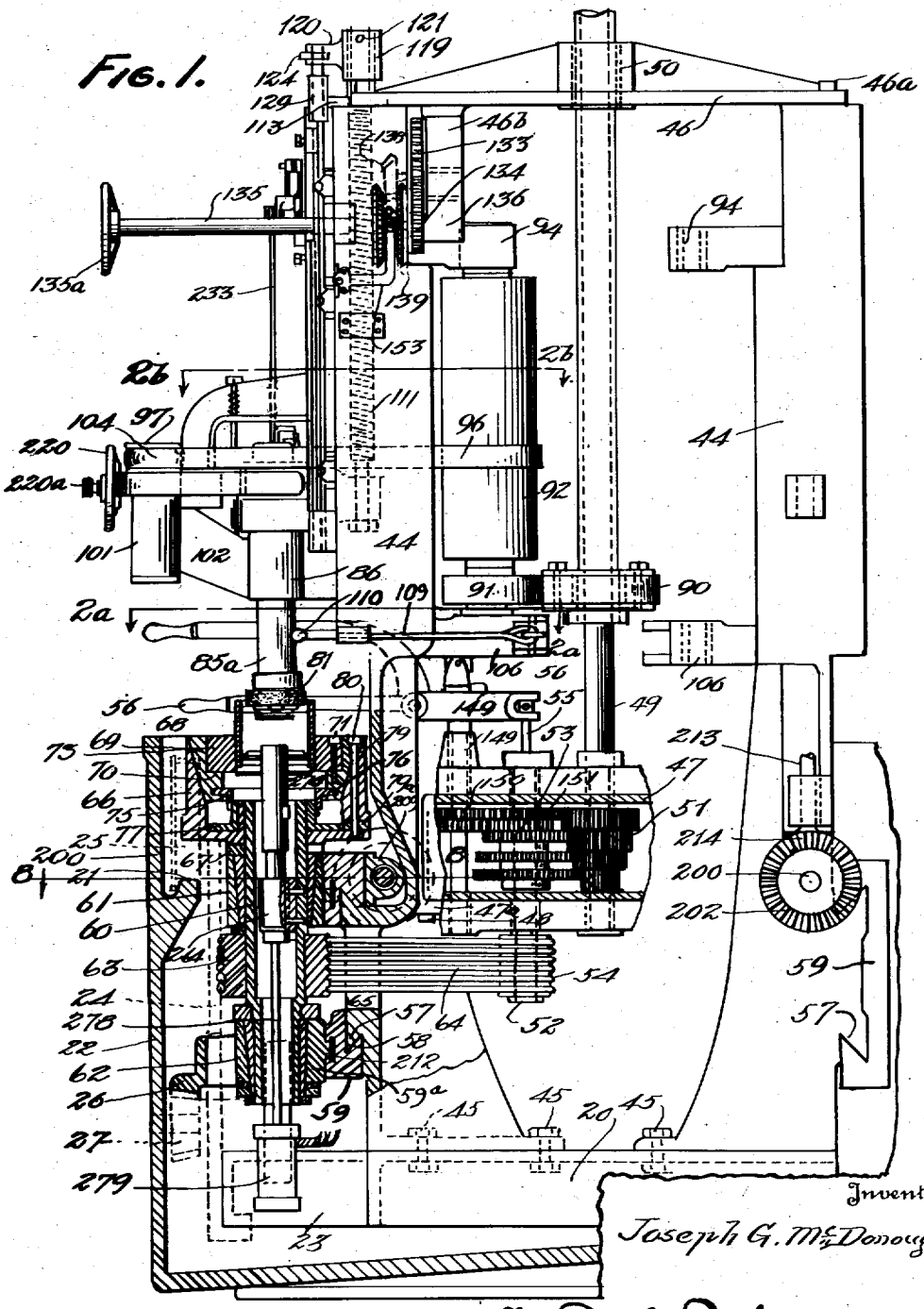

Aug 11, 1925. Re. 16,141

J. G. McDONOUGH

INTERNAL GRINDING MACHINE

Original Filed Oct. 31, 1921 15 Sheets-Sheet 1

Inventor
Joseph G. McDonough,
By Paul, Paul & Moore
Attorney

Aug. 11, 1925. Re. 16,141

J. G. McDONOUGH

INTERNAL GRINDING MACHINE

Original Filed Oct. 31, 1921 15 Sheets-Sheet 2

Inventor
Joseph G. McDonough,
By Paul Paul & Moore
Attorney

Aug. 11, 1925. Re. 16,141

J. G. McDONOUGH

INTERNAL GRINDING MACHINE

Original Filed Oct. 31, 1921 15 Sheets-Sheet 3

Inventor

Joseph G. McDonough,

By Paul Paul & Moore

Attorney

Aug. 11, 1925. Re. 16,141

J. G. McDONOUGH

INTERNAL GRINDING MACHINE

Original Filed Oct. 31, 1921 15 Sheets-Sheet 4

Inventor
Joseph G. McDonough,
By Paul Paul & Moore
Attorney

Aug. 11, 1925. Re. 16,141

J. G. McDONOUGH

INTERNAL GRINDING MACHINE

Original Filed Oct. 31, 1921 15 Sheets-Sheet 5

Aug. 11, 1925. Re. 16,141

J. G. McDONOUGH

INTERNAL GRINDING MACHINE

Original Filed Oct. 31, 1921 15 Sheets-Sheet 6

Inventor
Joseph G. McDonough,

Paul Paul & Moore

Attorney

Aug. 11, 1925. Re. 16,141
J. G. McDONOUGH
INTERNAL GRINDING MACHINE
Original Filed Oct. 31, 1921 15 Sheets-Sheet 7
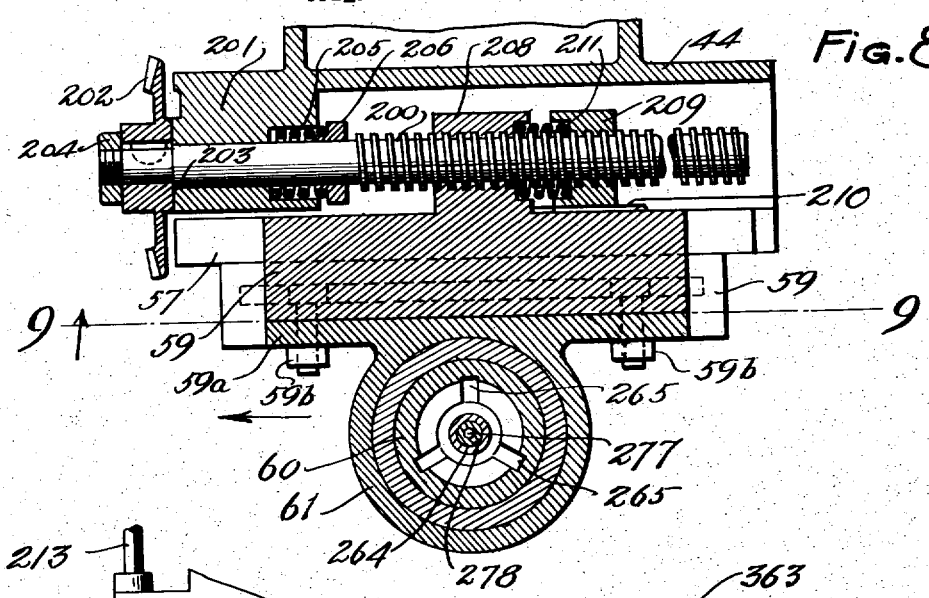
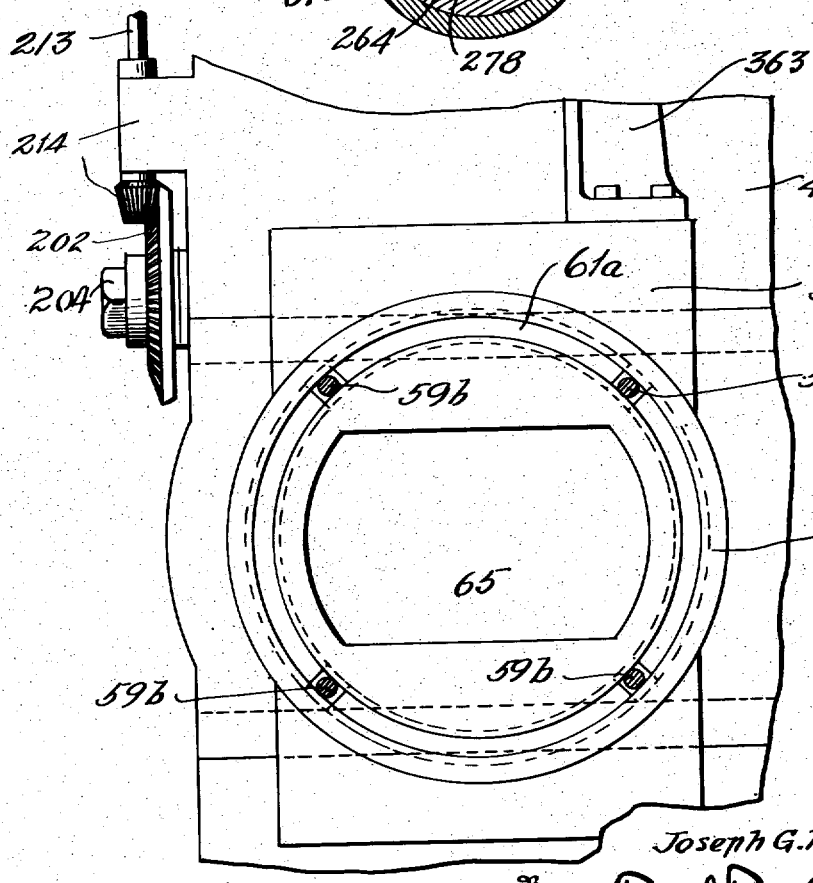
Inventor
Joseph G. McDonough,
By Paul Paul & Moore
Attorney Aug. 11, 1925. Re. 16,141
J. G. McDONOUGH
INTERNAL GRINDING MACHINE
Original Filed Oct. 31, 1921 15 Sheets-Sheet 8
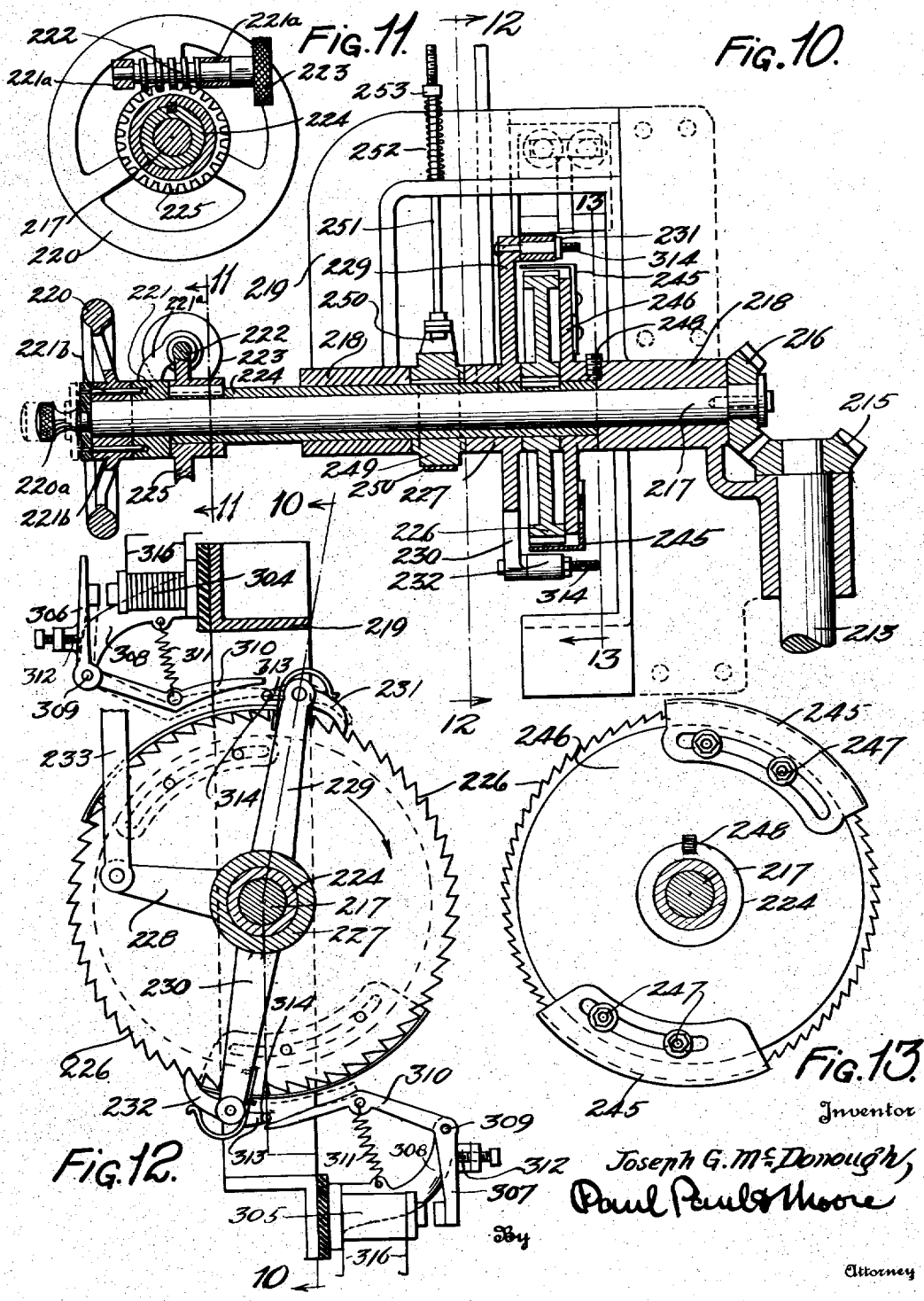
Inventor
Joseph G. McDonough,
By Paul Paul & Moore
Attorney Aug. 11, 1925. Re. 16,141
J. G. McDONOUGH
INTERNAL GRINDING MACHINE
Original Filed Oct 31, 1921 15 Sheets-Sheet 9
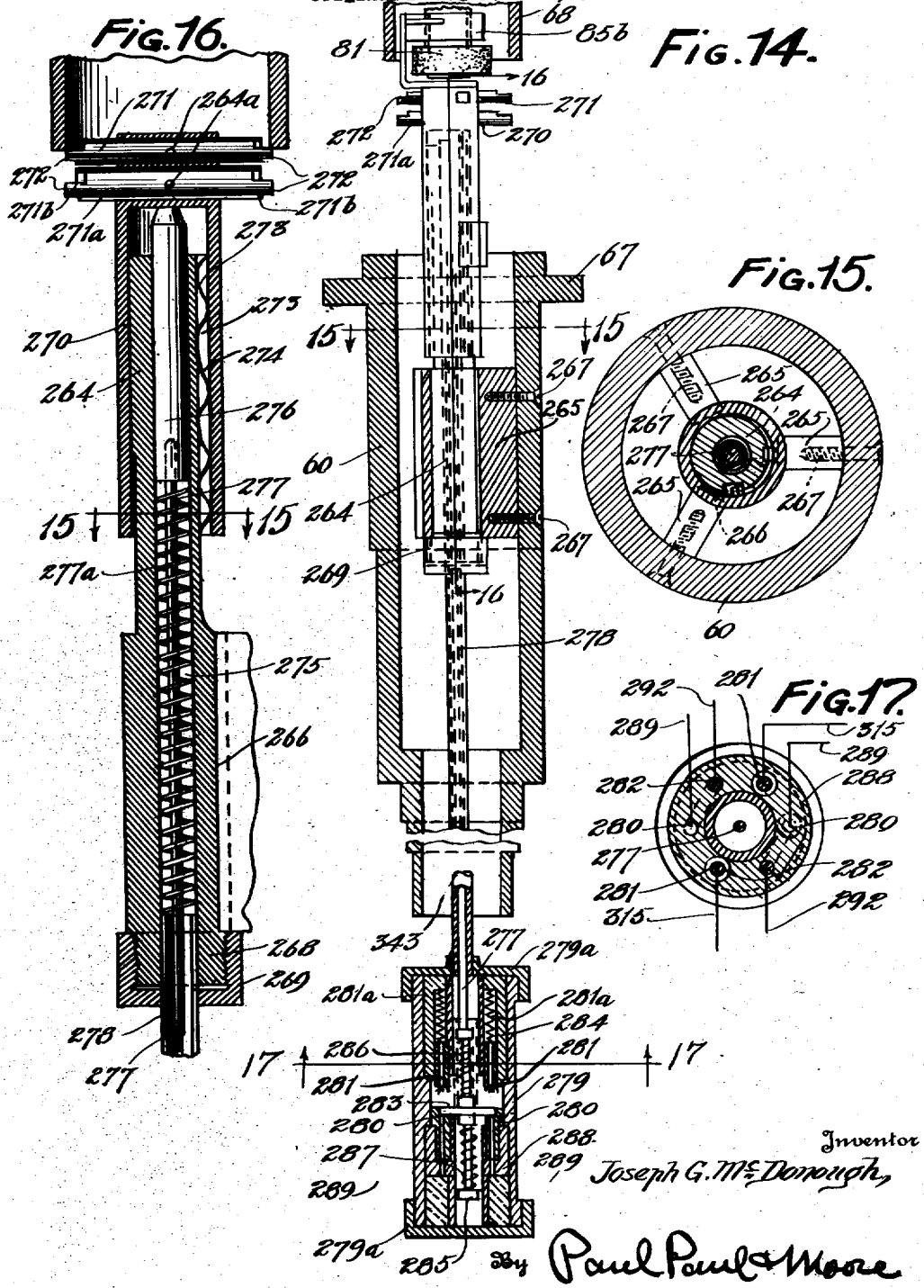
Inventor
Joseph G. McDonough,
By Paul Paul & Moore
Attorney Aug. 11, 1925. Re. 16,141
J. G. McDONOUGH
INTERNAL GRINDING MACHINE
Original Filed Oct. 31, 1921 15 Sheets-Sheet 10
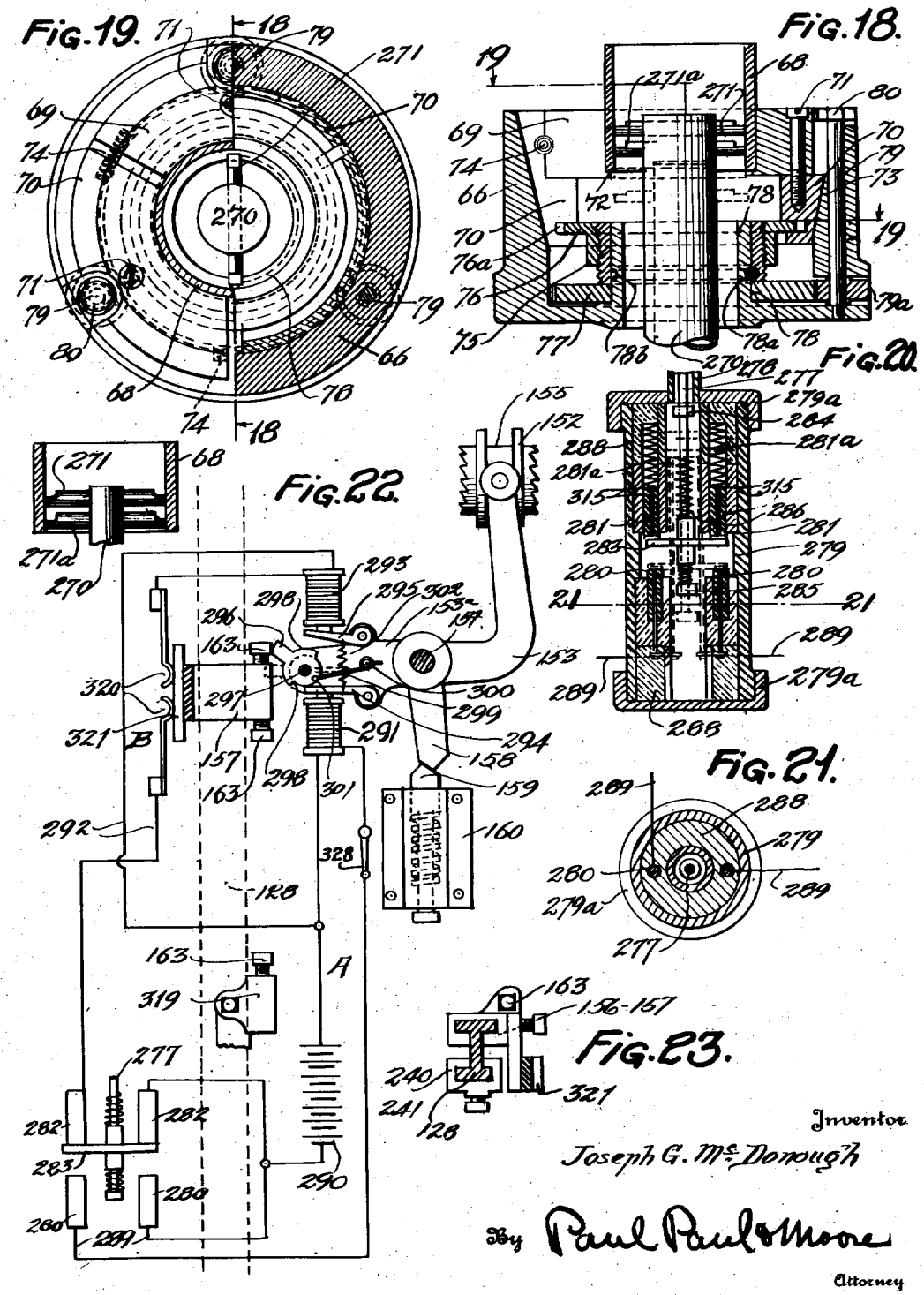
Inventor
Joseph G. McDonough
By Paul Paul & Moore
Attorney Aug. 11, 1925. Re. 16,141

J. G. McDONOUGH

INTERNAL GRINDING MACHINE

Original Filed Oct. 31, 1921 15 Sheets-Sheet 11

Inventor
Joseph G. McDonough,
Paul Paul & Moore
Attorney

Aug. 11, 1925. Re. 16,141

J. G. McDONOUGH

INTERNAL GRINDING MACHINE

Original Filed Oct. 31, 1921 15 Sheets-Sheet 12

Inventor
Joseph G. McDonough,

Paul Paul & Moore
Attorney

Aug. 11, 1925. Re. 16,141

J. G. McDONOUGH

INTERNAL GRINDING MACHINE

Original Filed Oct. 31, 1921 15 Sheets-Sheet 13

Inventor

Joseph G. McDonough,

By Paul Paulet Moore

Attorney

Aug. 11, 1925. Re. 16,141

J. G. McDONOUGH

INTERNAL GRINDING MACHINE

Original Filed Oct. 31, 1921 15 Sheets-Sheet 14

Inventor

Joseph G. McDonough,

By Paul Paul & Moore

Attorney

Aug. 11, 1925. Re. 16,141

J. G. McDONOUGH

INTERNAL GRINDING MACHINE

Original Filed Oct. 31, 1921 15 Sheets-Sheet 15

Inventor
Joseph G. McDonough,
By Paul Paul & Moore
Attorney

Reissued Aug. 11, 1925.

Re. 16,141

UNITED STATES PATENT OFFICE.

JOSEPH G. McDONOUGH, OF NEW ORLEANS, LOUISIANA.

INTERNAL-GRINDING MACHINE.

Original No. 1,497,574, dated June 10, 1924, Serial No. 511,616, filed October 31, 1921. Application for reissue filed January 21, 1925. Serial No. 3,884.

*To all whom it may concern:*

Be it known that I, JOSEPH G. McDONOUGH, a citizen of the United States, resident of New Orleans, Orleans Parish, State of Louisiana, have invented certain new and useful Improvements in Internal-Grinding Machines, of which the following is a specification.

My invention relates to machines for grinding the internal surfaces of metal cylinders, sleeves, gears, bushings, and the like commercial articles and the general object of the invention is to provide a machine that is capable of turning out rapidly and efficiently products of this class in cylindrical, conical and other forms, ground and finished uniformly to within the closest limits of the predetermined finished diameters, and that will automatically cease the grinding operation when this diameter has been attained or announce the fact to the operator, or both, and that will, furthermore, indefinitely continue this operation with the same accuracy and uniformity of output regardless of the wear of the grinding wheel.

More specific objects of the invention are:

First: To prevent the usual "bell mouthing" which consists in a perceptible outward flare at the ends of the internal cylindrical surface being ground, due to the necessity of repeated withdrawal of the grinding wheel from the cylindrical bore for the purpose of calibrating the internal diameter or introducing a gage plug.

Second: To eliminate the usual so-called "sagging" resulting in inaccuracy of the work and due to overhanging work-holding chucks or other fixtures in the ordinary horizontally operating internal grinding machines.

Third: To do away with the necessity of measuring the work during the progress or at the finish of the grinding, while at the same time automatically obtaining within close limits extremely accurate results in finished measurements.

Fourth: To automatically preserve practically the same high degree of accuracy both when grinding dry or wet or when grinding at different or varying temperatures. In the ordinary practice of gaging the work, the varying temperature of the pieces ground when gaged results in inaccurate measures when the work cools off to normal temperature after grinding.

Fifth: To accelerate the work and reduce the attendance necessary by automatically starting the grinding of a piece at an increased or heavier speed to remove more stock for each passage of the grinding wheel through the piece and then automatically reduce the feed to remove less stock during the final finishing operations.

Sixth: To make the feeds positive to the predetermined degree of feed by preventing the usual lost motion or play in the feed mechanism.

Seventh: To provide a machine of the multiple spindle type that will require but little attendance and that by its large capacity and rapidity and accuracy of action will enable the user of the machine to manufacture the finished articles cheaply and economically.

Other objects of the invention will appear from the following detailed description of the invention by reference to the accompanying drawings.

Figure 2:
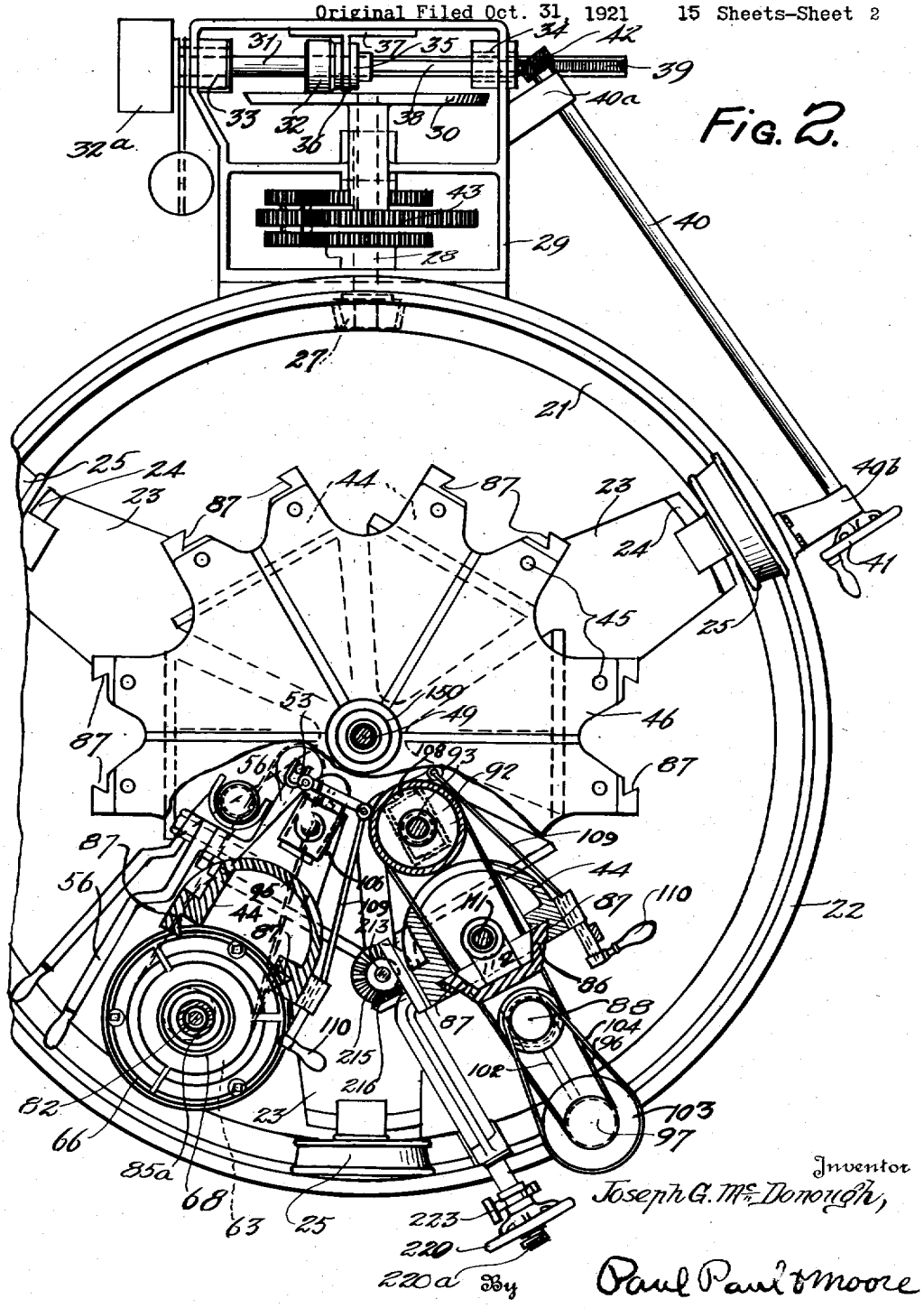
Figure 3:
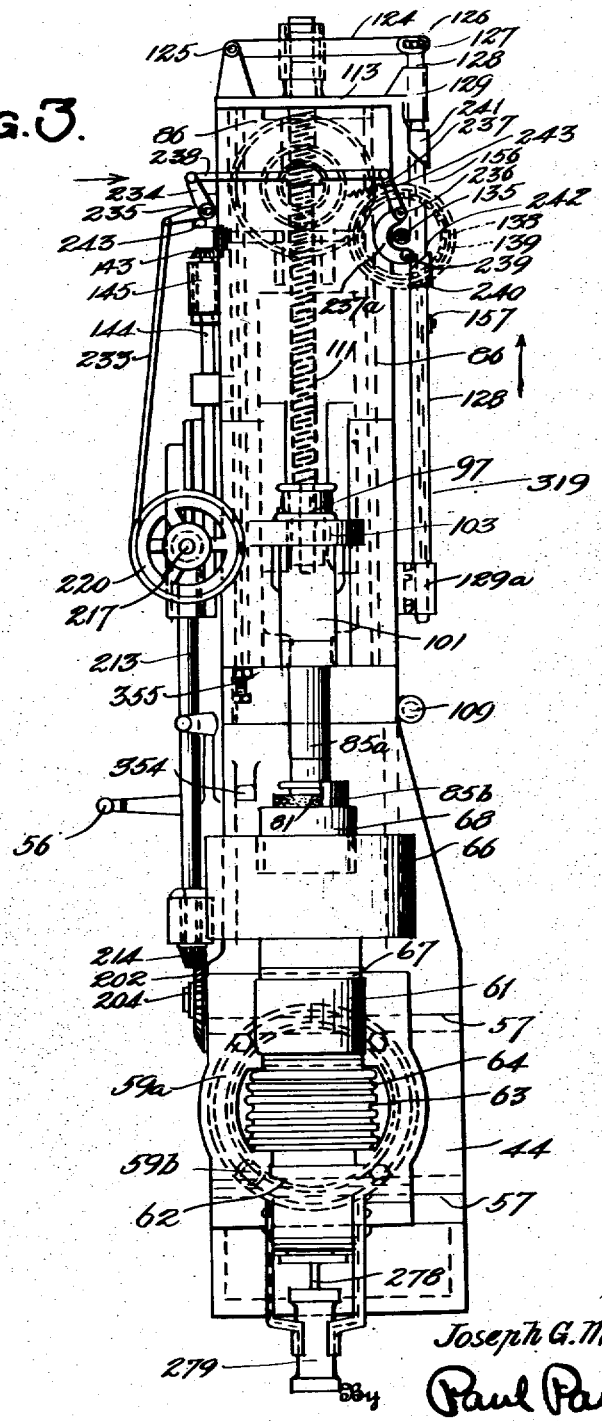
Figure 4:
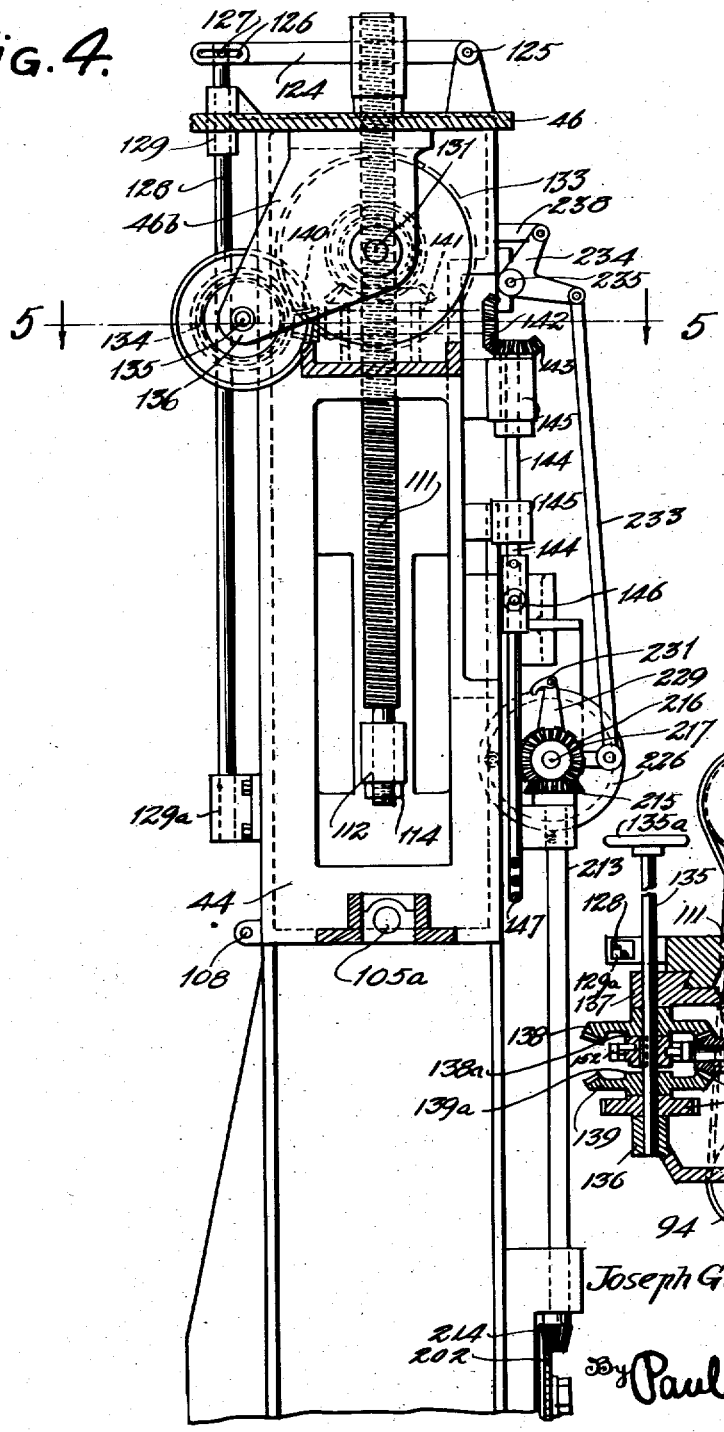
Figure 5:
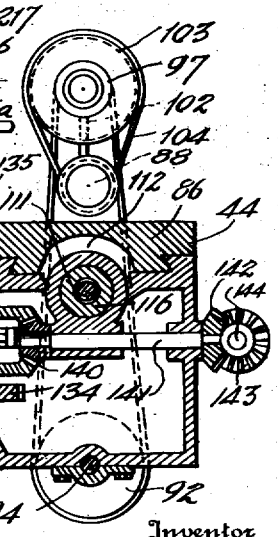
Figure 6:
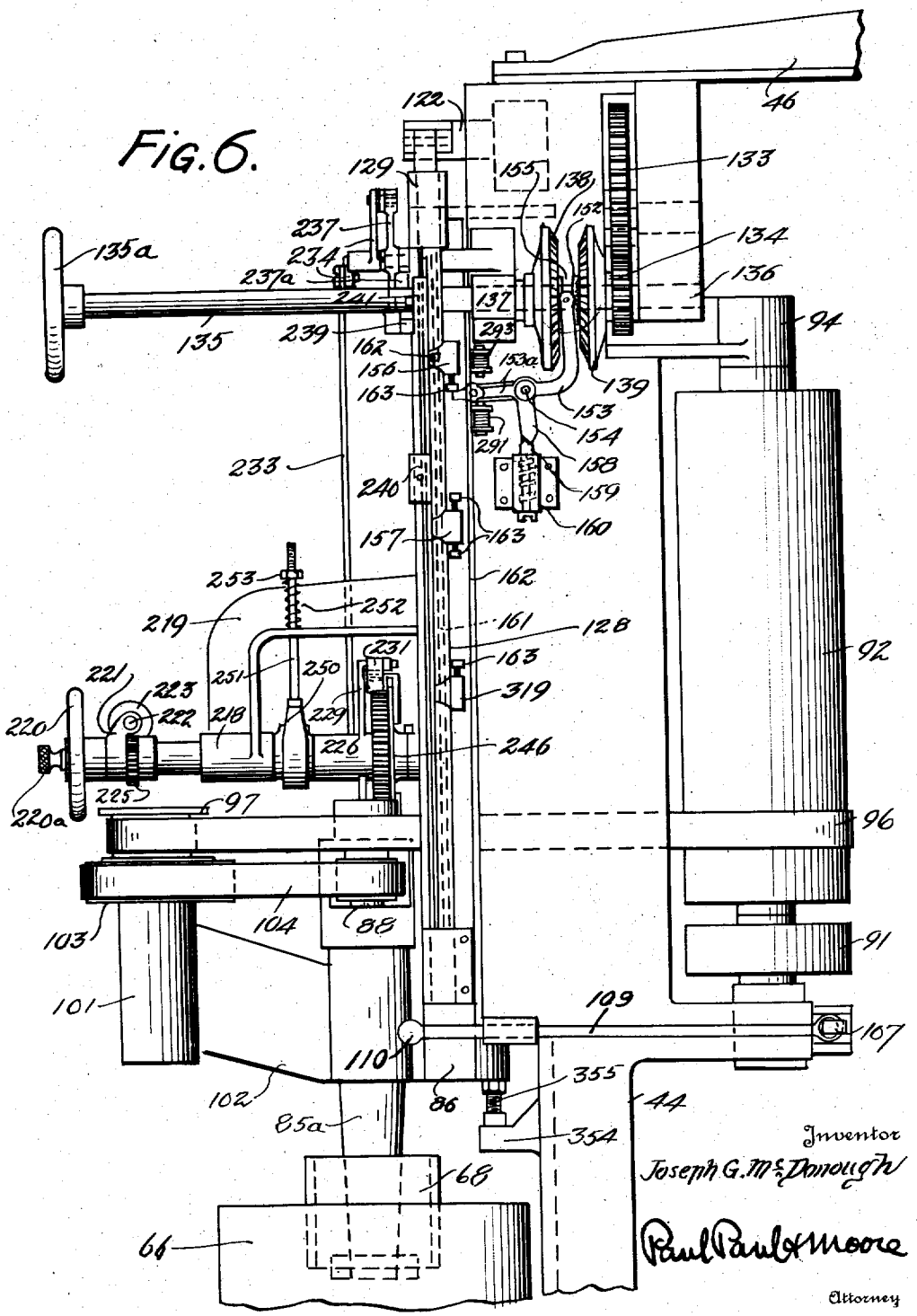
Figure 7:
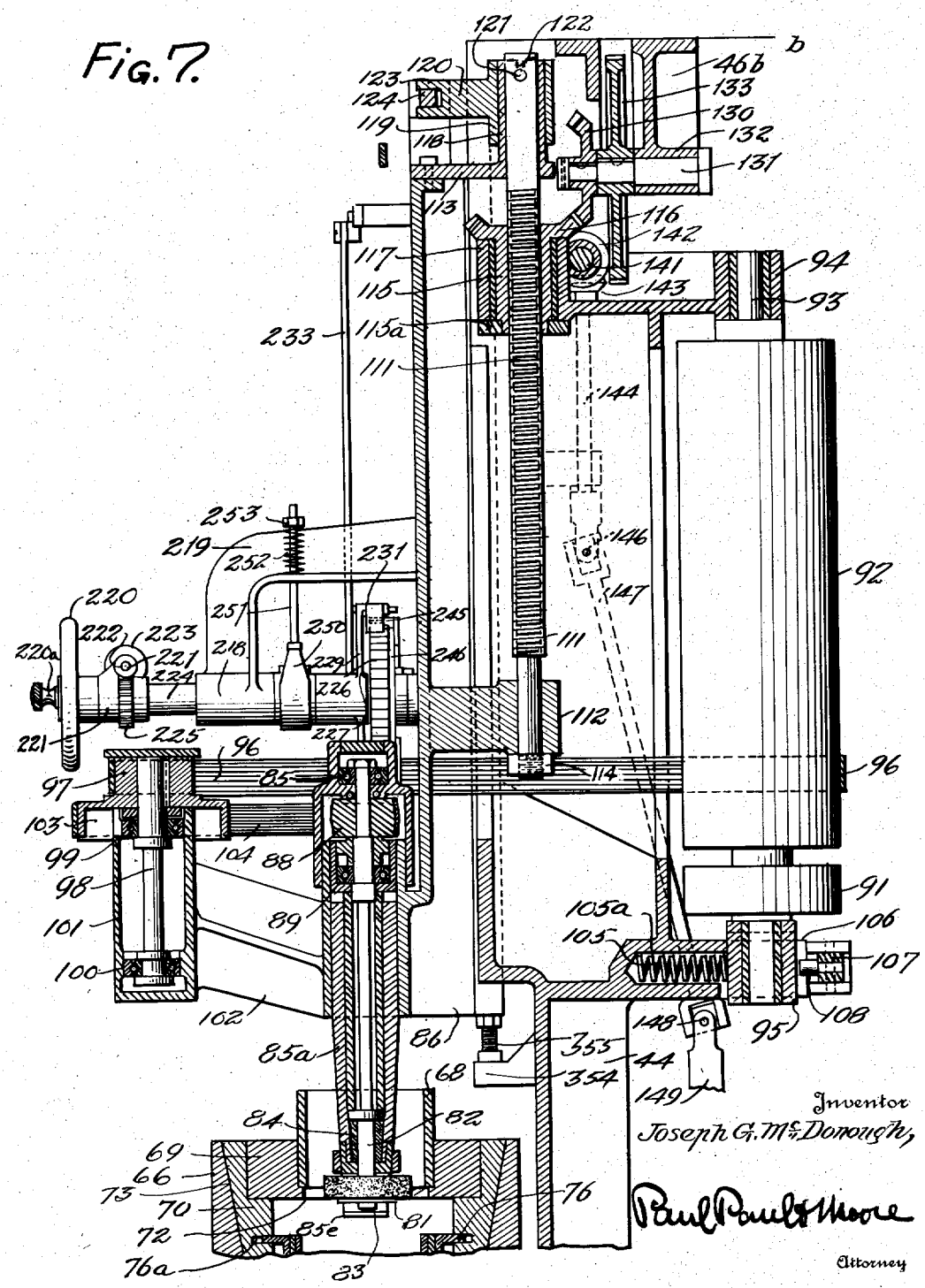
Figure 24:
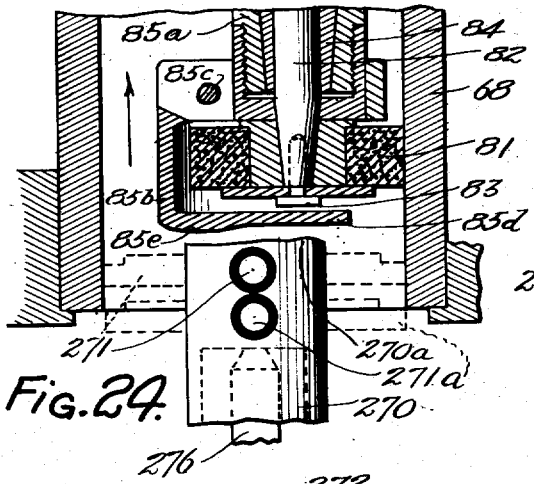
Figure 25:
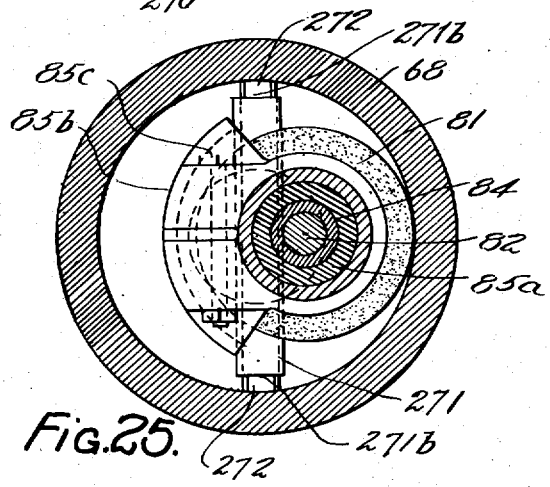
Figure 29:
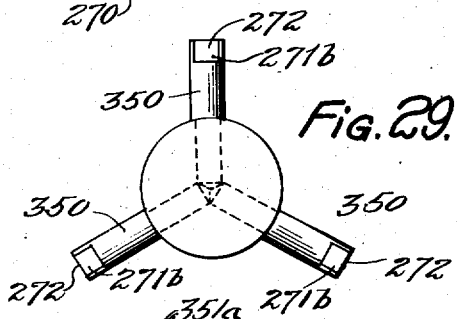
Figure 30:
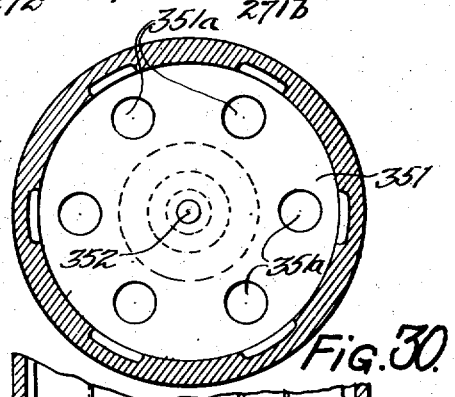
Figure 31:
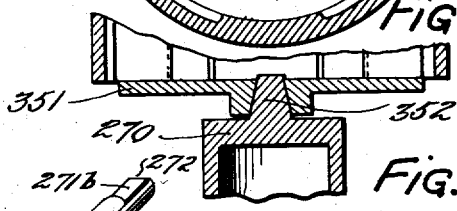
Figure 32:
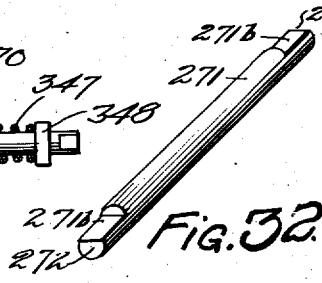
Figure 33:
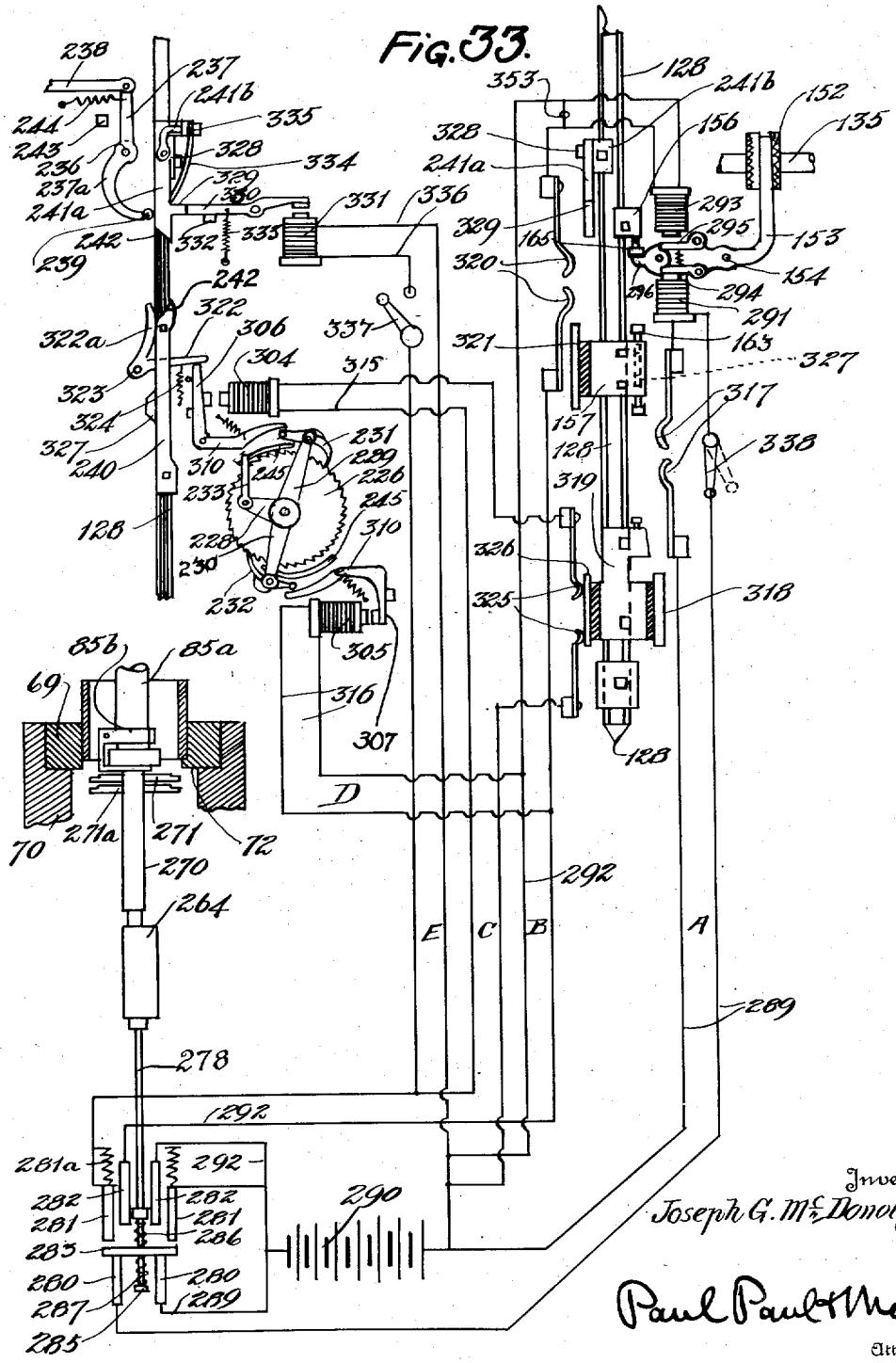
Figure 34:
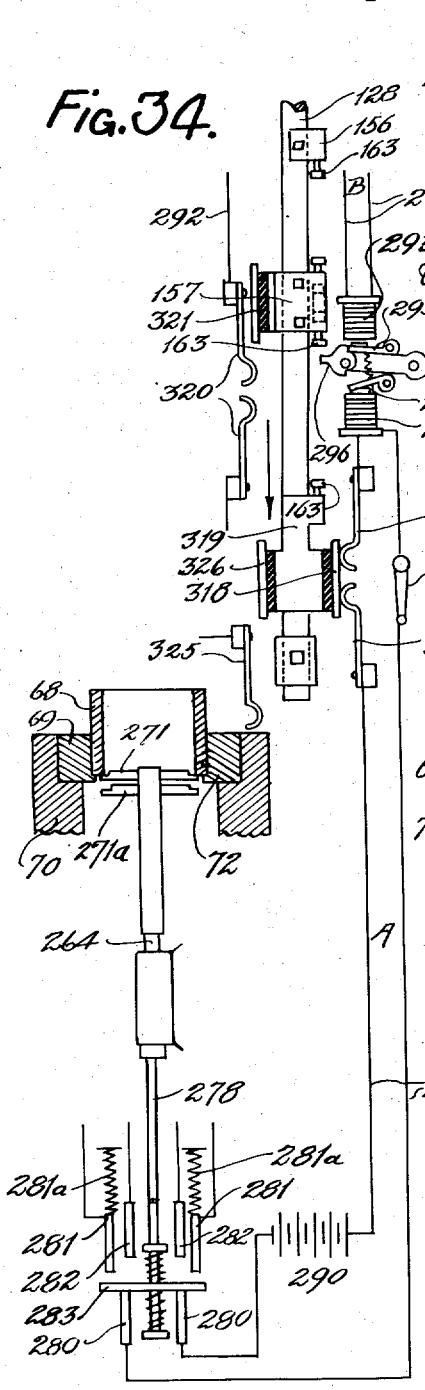
Figure 35:
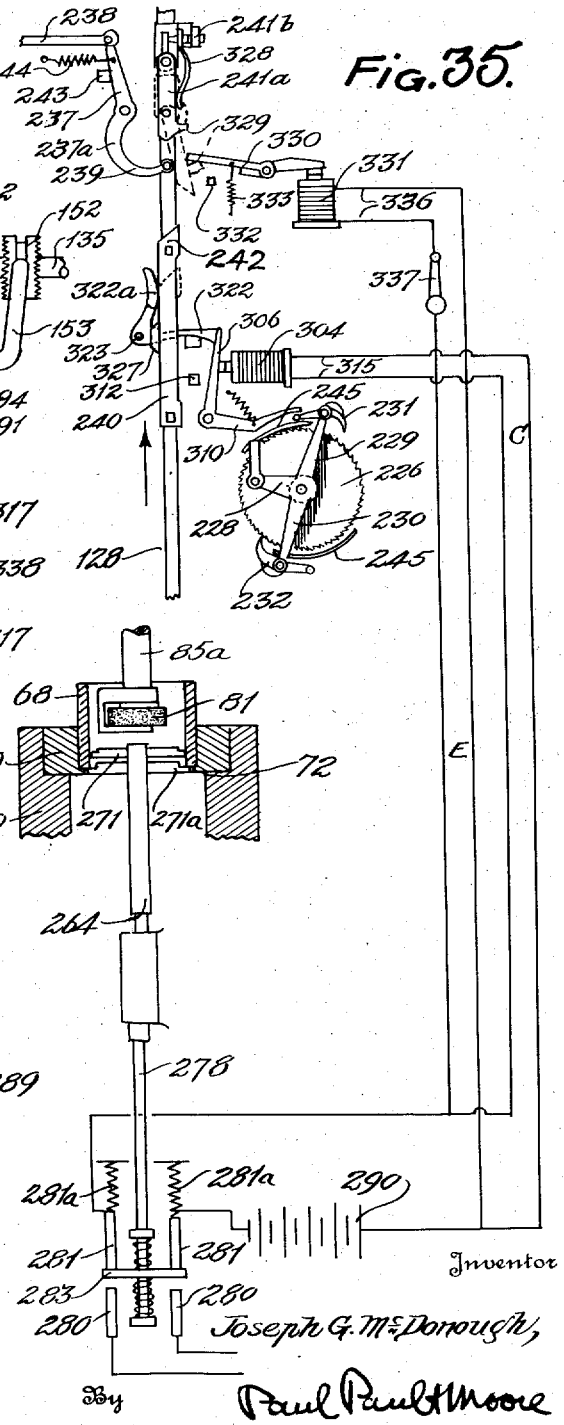
Figure 36:
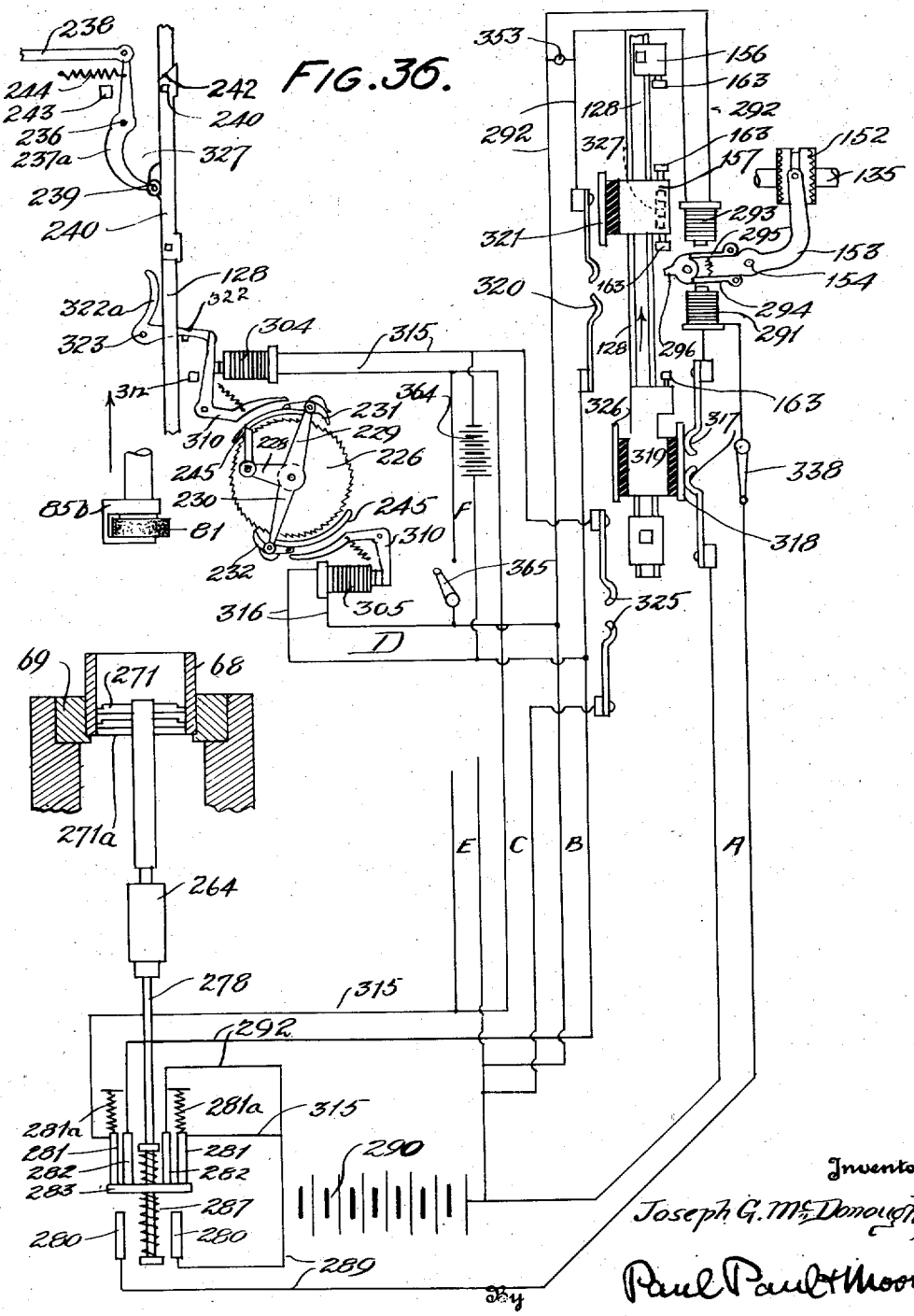
Figure 37:
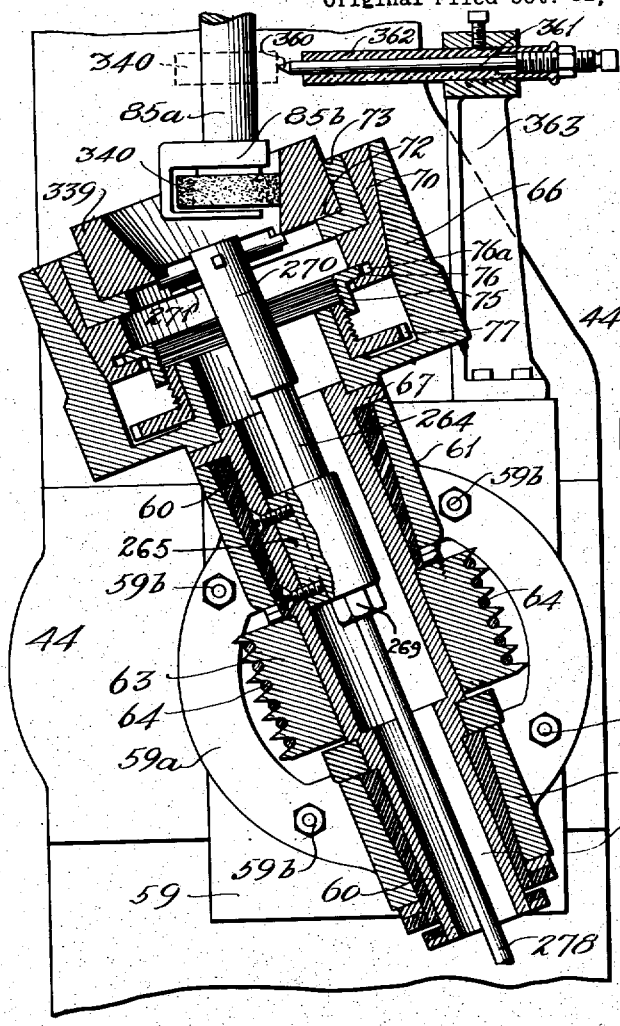
Figure 38:
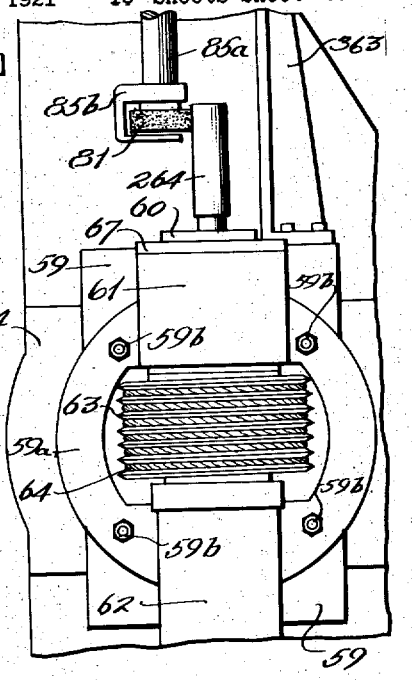
Figure 31A:
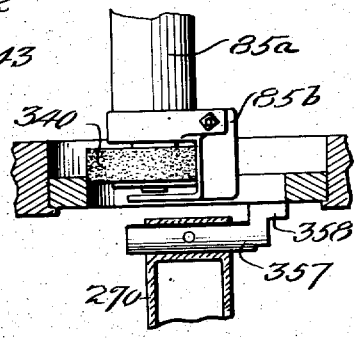
Figure 39:
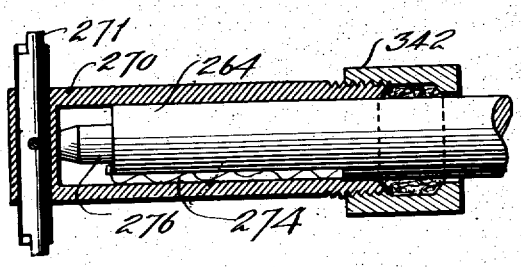

In the accompanying drawings forming part of this specification,

Figure 1 is a side elevation, partly in section, of a machine embodying my invention, Figure 2 is a plan and sectional view of a multiple spindle machine embodying my invention, and consisting of six spindle units, four of these units being removed and the left hand unit being shown in horizontal section on the line $2^a$ and the right hand unit section on the line $2^b$ of Figure 1, Figure 3 is a front elevation of one of the spindle units, Figure 4 is a rear elevation of one of the spindle units, Figure 5 is a horizontal sectional view on the line 5—5 of Figure 4, Figure 6 is a side elevation on a larger scale of one of the spindle units, showing the spindle carriage in a lowered position, Figure 7 is a central vertical section of the spindle unit as shown in Figure 6, Figure 8 is a horizontal section on the line 8—8 of Figure 1, showing the feed screw mechanism, Figure 9 is a vertical section on the line 9—9 of Figure 8, Figure 10 is a vertical section of the feed screw operating mechanism, the section being taken on the line 10—10 of Figure 12, Figure 11 is a vertical section on the line 11—11 of Figure 10, Figure 12 is a similar section on the line 12—12 of Figure 10, illustrating the electrically controlled feed mechanism, Figure 13 is a partial section on the line 13—13 of Figure 10, illustrating the adjusting means for the feed, Figure 14 is a vertical section through the gage supporting chuck spindle and electric control housing below the spindle, Figure 15 is a section on the line 15—15 of Figures 14 and 16, Figure 16 is an enlarged section on the line 16—16 of Figure 14, Figure 17 is a section on the line 17—17 of Figure 14, Figure 18 is a section on the line 18—18 of Figure 19, of the spindle chuck for holding the pieces to be ground and illustrating the method of gaging the work, Figure 19 is a plan view of the chuck, partly in section, on the line 19—19 of Figure 18, Figure 20 is an enlarged vertical section of the switch box shown in Figure 14 for controlling the vertical movements of the grinding wheel and its carriage, Figure 21 is a cross section on the line 21—21 of Figure 20, Figure 22 is a detail view of the carriage-controlling clutch-mechanism, illustrating in diagrammatical form the electrical connections between the clutch mechanism and the switch box, Figure 23 is a detail of the adjustable trip blocks, Figure 24 is a vertical section of the grinding wheel and stationary guard, illustrating the relative position of the gages and work when grinding a tube and automatically changing from a coarse to a fine feed, the grinding wheel being indicated as moving upward, Figure 25 is a plan view of Figure 24, Figures 26 to 31 inclusive illustrate modified forms of gage pins and means for securing said pins in accurate positions in the gage post, Figure 31ª shows a form of gage pin used when grinding short articles, Figure 32 is a perspective view of the generally preferred form of gage pin, Figure 33 is a diagrammatical view, illustrating the general automatic control and operation of the machine, Figures 34, 35 and 36 are similar views, illustrating the automatic electrical control of the spindle carriage and showing the parts in different positions, Figure 37 is a sectional view of the chuck and chuck spindle, illustrating how the machine may readily be adjusted to grind internal conical surfaces, Figure 38 is a detail view, illustrating how the gage post fastened in the hollow spindle may readily be ground perfectly concentric to the bearings after fastening, Figure 39 shows a modified form of gage post and means for protecting the post from water when used in a horizontal grinding position.

*The driving and grinding mechanism.*

In Figures 1 and 2 I have illustrated my invention as comprising a multiple spindle machine, but it will be understood that the claims of the invention are not confined to this construction, as each spindle section in itself is a complete, self-contained grinding unit capable of independent operation.

While I have illustrated in the drawings a multi-spindle grinding machine of a circular type, it will also be understood that the grinding spindles may be arranged in banks or rows or any other convenient form and that the invention is not confined to the multi-spindle feature but is mainly embodied in the novel construction and operation of each of the single grinding units.

Referring first to Figures 1 and 2 for an illustration of the construction and operation of the multiple spindle feature of the machine, it will be noted that the base frame 20 supporting the structure comprising the six spindle units is rotatable upon the circular track 21 of the main bed frame 22. Integral arms 23 project from the base frame 20 to which are secured vertical brackets 24 carrying at their upper ends flanged rollers 25 adapted to roll on the track 21 and support the whole operating structure. A beveled ring gear 26 is rigidly secured to the vertical brackets 24 and meshes with a beveled pinion 27 carried by a shaft 28, that is journaled in suitable bearings in the housing 29 and is also provided with a friction disc 30. A driving shaft 31, having a wheel 32 in frictional engagement with the disc 30 and a driving pulley 32ª, is journaled transversely to the shaft 28 in bearings 33 and 34. The friction wheel 32 is splined slidably on the shaft 31 and is provided with a grooved hub 35, engaged by a forked member 36 that is supported in a guide-way 37 and is connected to a rack bar 38, projecting through the housing 29 outside of which it is provided with a rack 39. A shaft 40, mounted in bearings 40ª and 40ᵇ on the stationary frame of the machine, carries at one end an operating hand wheel 41 and at the other a gear 42 in mesh with the rack 39. Motive power may be applied from any suitable source to the driving pulley 32ª which will transmit motion through the shaft 31 and friction members 30 and 32 to the shaft 28. Suitable planetary reduction gearings 43 may be arranged in connection with the shaft 28, but this as well as the driving mechanism above described forms no part of the present invention and it is not thought necessary to illustrate and describe the driving mechanism more in detail. It will be clear, however, from the above that as the shaft 28 and beveled pinion 27 rotate, the base frame 20 and the superstructure carried by it will be caused to rotate by means of the ring gear 26 and that the rotating speed of the structure may be varied as desired by operating the hand wheel 41, sliding rack bar 38 and thereby adjusting the friction wheel 32 on the friction face of the disc 30 to any desired position. The mechanism comprising each of the grinding units is mounted in the vertical frames or columns 44, that are at the bottom secured to the base frame or plate 20, preferably by bolts or screws 45, and are rigidly secured together at the top by the spider plate 46 and screws 46[a]. An intermediate frame or housing 47 is secured to the vertical frame members 44, preferably by lugs 47[a] and screws 48, and a central or master shaft 49 is journaled in this frame below and has bearings 50 above in the spider plate 46. This shaft 49 may be driven in any suitable manner, preferably by an electric motor (not shown) and drives the entire mechanism of all the grinding units through suitable speed change gearing 51 in the housing 47. As the construction and operation of all the grinding units operated by this master shaft are identical, the following description pertains equally to all the units.

A vertical shaft 52 provided with speed change gearing 53, meshing with the gearing 51, is mounted in bearings in the housing 47 and carries at its lower end a pulley 54, the function of which will hereinafter appear. The speed change for this shaft is effected preferably by means of a sliding key (not shown) in the shaft 52 operated through a rod 55 by a hand lever 56, but as this mechanism forms no part of the invention and any method of effecting speed changes from the shaft 49 to the shaft 52 may be employed, I have not illustrated the details of this speed change mechanism.

The column 44 is provided with horizontal V-flanges or tracks 57, accurately fitting corresponding riders 58 in a lateral feed block or saddle 59 by means of which said saddle is supported capable of a horizontal movement relative to the column 44. A hollow spindle 60 is journaled in bearings 61 and 62 upon a bearing-head 59[a] adjustably secured to the saddle 59 in a circular slot 61[a] (Figure 9) by means of slot bolts 59[b] and carries a pulley 63 on a horizontal line with the pulley 54. A series of flexible belts 64 pass from the pulley 63 through a slot 65 in the column 44 around the pulley 54 by which the spindle 60 is started without shocks from the shaft 52 and rotated primarily from the master shaft 49.

The spindle 60 carries on its upper end a cylindrical chuck 66 supported on a flange 67 of the spindle and this chuck is provided with universal clamping means for accurately centering and holding the tube or other cylindrical work piece 68 or piece to be ground (see Figures 18 and 19). The clamping means preferably consists of three hardened clamping segments 69 removably fastened to three segmental wedge blocks 70 by screws 71. The work-piece 68, when inserted in the clamp ring, rests on a slightly protruding flange 72 at the bottom of the ring segments and these segments may be removed and others substituted of a different internal radius to fit different size tubes to be ground. The wedge blocks 70 are formed externally conical, fitting the internal conical surface 73 of the chuck 66 and when the tube 68 is to be inserted, the blocks 70 are raised, to spread or expand the ring segments 69, these segments being under constant spreading tension by means of coiled springs 74 inserted in the end of the segments between their separated joints, (Figure 19). After the work-piece 68 has been inserted, all the segments comprising the clamp unit are forced downward, thereby uniformly contracting the ring segments and centering and securely clamping the piece in place. The vertical adjustment of the clamp members is preferably effected by means of an internally threaded sleeve 75 having a flange 76 engaging a circular groove 76[a] in the wedge blocks 70 and being in threaded connection with the external threads of the hub of a gear wheel 77, loosely mounted upon a central boss 78 of the chuck 66 for rotation, but held against vertical displacement by a ball 78[a] in an annular groove 78[b]. Spindles 79 carrying pinions 79[a] in mesh with the gear wheel 77 are arranged in the rim of the chuck and project to the top thereof where they are provided with hexagon or equivalent shaped heads 80. By means of a wrench applied to any one of the spindle heads, the gear 77 may be rotated in either direction, thereby forcing the sleeve 75 and wedge blocks 70 up or down to release therefrom, or clamp the ring segments tightly around the work piece 68 (Figures 18 and 19). The grinding wheel 81, consisting of emery, carborundum, or other suitable material, is mounted on a vertical arbor 82 (see Figures 3, 7 and 24) and removably attached thereto by means of a clamping screw 83 or other equivalent means. The arbor 82 carrying the grinding wheel 81 is mounted vertically in bearings 84 and 85 arranged within a dust proof housing 85[a] provided in a frame or carriage 86 that is vertically slidable in V-slots 87 in the column 44 (see Figure 2). The arbor 82 is provided at its upper end with a driving pulley 88 and an anti-friction thrust bearing 89 and is driven at high speed from the master shaft 49 by means of a pulley 90 frictionally engaging a pulley 91 fastened to a vertical roller pulley 92, said pulley being mounted upon a shaft 93 having upper bearings 94 and lower adjustable bearings 95, arranged upon the column 44 (Figure 1). A driving belt 96 runs from the roller pulley 92 through slots in the column 44 and around a small pulley 97 carried by a short spindle 98 journaled in ball bearings 99 and 100 in a housing 101 integrally connected to the carriage 86 by a bracket or arm 102 (Figure 7). A larger pulley 103 is preferably cast integral with the small pulley 97 and a belt 104 runs from this pulley around the arbor pulley 88. Frictional tension is provided between the friction pulleys 90 and 91 by means of a coil spring 105 arranged in a socket 105[a] in the column 44 and tensioned against the bearing block 95, that is mounted for a slight lateral movement between the guide lugs 106 (see Figure 7). I prefer to provide means for temporarily throwing the friction wheels out of engagement consisting of a lever 107 pivoted on one of the guide lugs 106 and having a pin 108 normally free of the bearing block 95 but when the lever 107 is rocked towards the block by means of a rod 109 having a handle 110 (see Figure 2), the block 95 may be moved slightly against the tension of the spring 105 to release the friction wheel 91 from the driving wheel 90 and stop rotation of the roller pulley 92.

In the operation of grinding a tube or cylinder to an exact predetermined internal diameter, the rotating grinding wheel is automatically and repeatedly passed downwards and upwards in grinding contact with a small arc of the internal surface of the cylinder until the predetermined internal diameter is attained. The chuck 66 containing the cylindrical work-piece to be ground simultaneously rotates in the opposite direction, driven by the belt 64. At the conclusion of either the downward or upward movement of the grinding wheel 81 or at both ends of the movement, as will be hereinafter described, the saddle 59 carrying the chuck 66 is automatically moved laterally in the direction of the grinding wheel to again bring the work-piece in active grinding contact with the grinding wheel.

When the piece has been finished to the required internal diameter, the grinding wheel 81 is automatically raised to a higher plane above the chuck 66 and preferably continues to operate idly at the higher plane while the finished piece is being removed and a fresh one inserted in the chuck 66.

The vertical reciprocating movement in different planes of the carriage 86, carrying the arbor for the grinding wheel 81, is obtained preferably by the hereinafter described means. Referring to Figures 3 and 7, a screw shaft or worm 111 is slidably mounted at its lower end in a lug 112 of the carriage 86 and is provided with a nut 114 below the lug 112. The worm passes through an internally threaded hub 115, of a bevel gear 116 that is rotatably mounted in a bearing on the column 44, and is provided at the lower end of the hub 115 with a thrust collar 115[a]. The carriage is provided at its upper end with a bracket 113 having a boss 118 concentric with the bearing. A sleeve 119 having a forked projection 120 slidably fits the boss 118 and a pin 121 passes through holes in the shaft 111 and sleeve 119 and through a slot 122 in the boss 118. The forked end 123 of the projection 120 embraces a lever 124 pivoted at 125 to a lug on the bracket 113 and having on its opposite end a slot 126 engaging a pin 127 that is carried by a vertical trip bar 128 supported in bearings 129 and 129[a] upon the carriage 86 and capable of a limited vertical adjustment. The screw shaft 111 is prevented from rotating by the pin 121 and it will be seen that as the bevel gear 116 is rotated in the bearing 117 the shaft 111 will be moved vertically in the threaded hub of the gear 116 and that the carriage 86 will be moved up or down, accordingly as the gear is rotated in one or the other direction. Rotation is imparted to the gear 116 by the bevel gear 130 secured on a shaft 131 and meshing with the gear 116 and this rotation is automatically reversed at the end of each vertical movement of the carriage 86 by the following described mechanism. The shaft 131 to which the bevel gear 130 is secured is preferably rotatably mounted in a bearing 132 carried by a bracket 46[b] depending from the spider 46 and carries a larger spur gear 133 keyed thereto. This gear is in mesh with a spur gear 134 (Figures 1, 4 and 5) keyed or otherwise secured to a shaft 135 that is mounted in bearings 136 and 137 on the column 44 and carries bevel gears 138 and 139 running loosely thereon. The bevel gears 138 and 139 are in constant mesh with a small bevel gear 140 upon a shaft 141 journaled in bearings in the column 44 and provided at its outer end with another bevel gear 142 in mesh with a similar gear 143 upon a vertical shaft 144 having bearings 145 upon the column 44 and provided at its lower end with a universal coupling 146 (see Figures 4 and 7). A tumbler rod 147 connects this coupling with a similar coupling 148 upon a shaft 149 mounted in bearings in the housing 47 (see Figures 1 and 7), and driven by gearing 150 from gearing 151 arranged on the speed change shaft 52. Through the above described transmission mechanism the bevel gears 138 and 139 are caused to rotate in opposite directions upon the shaft 135.

These gears are provided with clutch teeth 138[a] and 139[a] respectively (see Figures 5, 6, 22, 33, 34 and 36) and a clutch collar 152 having corresponding clutch teeth to interlock with the teeth 138[a] and 139[a], is arranged between the gears 138 and 139 and is slidingly splined to the shaft 135 to rotate therewith. It is obvious that if the clutch collar 152 is brought in engagement with the clutch teeth of the gear 138, the gear 116 will be revolved in a predetermined direction and if the clutch collar is connected to the clutch teeth of the gear 139 the gear 116 will be revolved in the opposite direction and that the carriage 86 will be moved in corresponding opposite vertical directions. Clutch connection is shifted alternately between the gears 138 and 139 caused by the vertical travel of the carriage 86 by means of a bell crank lever 153 (see Figure 6) fulcrumed at 154 on the column 44 and engaging with considerable axial play an annular slot 155 in the clutch collar. The lateral arm 153[a] of the bell crank lever is alternately struck at the termination of the carriage travels, by trip blocks 156 and 157, thereby rocking the lever on its fulcrum and moving the clutch collar from connection with one to the other of the gears 138 and 139. The lever 153 is preferably provided with a depending arm 158 engaged by a spring-pressed latch 159 slidingly arranged in a bracket 160, the arm and latch having beveled interlocking ends for tripping and holding the lever 153 in either extreme position with the clutch collar 152 in engagement with one of the gears 138 or 139. The trip blocks 156 and 157 are vertically adjustable on the bar 128 (Figure 23) to adjust the travel of the carriage to various lengths of grinding work. Adjustment of the travel of the carriage to close limits may be readily made by adjusting the actuating screws 163 in the blocks 156 and 157.

*The lateral feed or "setting up" mechanism.*

The work-carrying chuck 66 and chuck spindle 60, as above described, are mounted on the lateral feed block or saddle 59 and means are provided to move this saddle upon its guideway laterally against the grinding wheel at the termination of the vertical travel of the wheel carriage 86. As some of these feeding movements, when extreme accuracy is required, are very slight in extent, at times not exceeding one ten-thousandth part of an inch to secure the required accuracy, means are provided whereby the natural slack in the motion transmitting screw is compensated for.

Referring first to Figures 1, 8 and 9, the feed screw 200 is mounted in a bearing 201 in the column 44 and is provided with a driving bevel gear 202, keyed to the shank of the screw and rigidly held against a shoulder 203 by a threaded nut 204. The faced back of the gear 202 is held to bear against the faced end of the bearing 201 by a coil spring 205 arranged in a socket in the bearing and tensioned against a collar 206 held against longitudinal movement on the feed screw shank. The threads of the feed screw 200 fit internal threads in a lug 208 integral with the feed block 59 and also with the internal threads of a follower nut 209. This nut is free to slide with the feed block but is prevented from turning by bearing against a face 210 on the feed block. A coil spring 211 is interposed between the lug 208 and nut 209 and keeps the threads of the lug against the driving side of the screw threads. The feed screw 200 is rotated by means hereinafter described to move the feed block 59 in the direction of the arrow in Figure 8 when feeding the work against the grinding wheel and it will be seen that any play in the screw threads or back lash in the screw is effectually prevented by this construction. A tongue 212 (Figure 1) of the ring formed bearing block 59[a] projects into the circular groove of the feed block and by reason of this construction, the chuck-carrying spindle 60 may be readily adjusted for any desired alinement and secured in place by the clamping bolts 59[b] (Figures 8 and 9). The feed screw 200 is operated through a vertical shaft 213 mounted in bearings on one side of the column 44 and carrying at its lower end a small bevel gear 214 in mesh with the feed screw gear 202 and at its upper end a bevel gear 215 (see Figures 3, 10 to 13) in mesh with a bevel gear 216 carried by a shaft 217. This shaft is mounted in bearings 218 in a bracket 219 that is fastened to the side of the column 44 (Figure 7). A hand wheel 220 is keyed to the outer end of the shaft 217 and a collar 221 having yoke arms 221[a] is loosely mounted on said shaft. A finger plate 220[a] having locking pins 221[b] passing loosely through the hub of the hand wheel 220 and normally into holes in the yoke collar 221, is arranged on the end of the shaft 217. By means of this finger plate the hand wheel 220 and shaft 217 may be brought in or out of operating connection with the yoke collar 221. Between the yoke arms 221[a] and journaled therein, is a worm 222 provided with a knurled finger grip 223. A sleeve 224 surrounds the shaft 217 and this sleeve is provided at its outer end with a worm wheel 225 in mesh with the worm 222 and at its inner end with a ratchet wheel 226, both worm wheel and ratchet wheel being keyed to the sleeve to turn therewith (Figures 10 and 11). A short sleeve or hub 227 having arms 228, 229 and 230, is loosely mounted on the sleeve 224, and spring-pressed pawls 231 and 232 are pivoted to the arms 229 and 230 respectively and are in a position to engage the ratchet 226. The pawls 231 and 232 are actuated to turn the ratchet wheel in the direction of the arrow in Figure 12 by means of a connecting rod 233 pivoted to the arm 228 and to a bell crank lever 234 (see Figures 3 and 4) fulcrumed at 235 on the column 44. On the opposite side of the column is fulcrumed at 236 a feed lever 237 and a horizontal rod 238 connects the said lever with the vertical crank arm of the bell crank lever 234 (Figure 3). The lever 237 is provided with a depending arm 237[a], preferably curved to clear the shaft 135 and provided with a roller 239 (Figures 3, 6, 33, 35 and 36). The vertical trip bar 128, attached to the carriage 86, as heretofore described, is provided with actuating cam blocks 240 and 241 (Figures 3 and 33) having inclined faces 242 and the roller 239 is in position to be engaged by these faces, whereby the lever 237 will be rocked on its fulcrum in the direction of the horizontal arrow in Figure 3 at the end of the upward and downward movement of the spindle carriage 86.

A stop lug 243 is provided on the column 44 and a spring 244 normally keeps the vertical arm of the bell crank lever 237 against this stop, as shown in Figure 35, where the carriage is represented as in its upward travel, the inclined face of the lower block 240 moving toward the roller 239. A further movement of the carriage in the direction of the vertical arrow will force the depending arm 237[a] inward and rock the lever 237, bell crank lever 234 and pawl-carrying arms 229 and 230, thereby actuating the ratchet wheel 226 in the direction of the arrow in Figure 12. During the subsequent downward travel of the carriage 86, gravity aided by the spring 244 will return the actuating parts to the normal position and at the termination of the downward movement of the carriage the inclined face 242 of the upper actuating cam block 241 will likewise engage the roller 239 and again actuate the ratchet wheel 226 in the same direction. The intermittent rotary motion of the ratchet wheel thus produced is transmitted to the feed screw 200 through the worm wheel 225, yoke 221, horizontal shaft 217, vertical shaft 213 and bevel gears 214 and 202. The oscillations of the pawl-carrying arms 229 and 230, as produced by the actuating cam blocks 240 and 241, are of a fixed predetermined degree, but it is desirable that the length of the intermittent rotary movement of the ratchet wheel be adjustable and I therefore provide means whereby the actuating pawls are lifted out of contact with the ratchet teeth during any desired portion of their strokes.

Referring to Figures 10, 12 and 13, I accomplish this result by providing slotted curved shields or covers 245, closely overlapping the ratchet teeth and preferably adjustably fastened to a stationary disc 246 by means of clamping bolts 247. The disc 246 is preferably mounted loosely upon the sleeve 224 or shaft 217 and is shown held against rotation by a threaded key 248 screwed partly in the hub of the disc 246 and partly in the bearing 218. As shown, the covers 245 are adjusted so that the upper pawl 231 will advance the ratchet wheel 226 four teeth, while the lower pawl 232 will advance the ratchet wheel 226 only one tooth, the pawl-carrying arms being shown at the limit of their movement in the direction of the arrow in Figure 12. Means are provided, as will be hereinafter described, for lifting any one or both pawls out of working contact with the ratchet wheel, but when both pawls are in working position, as shown in Figure 12, the ratchet wheel will be advanced four teeth for every forward stroke of the pawls, the pawl 232 being substantially inactive and sliding over the cover 245 except for the last tooth length of the stroke. When, however, the upper pawl 231 is raised, as indicated by dotted lines in Figure 12, the ratchet wheel will be advanced a one tooth length only by the pawl 232 for each working stroke of the pawls. The feed screw 200 will be turned in degrees corresponding with the ratchet wheel and will move the saddle 59 carrying the chuck spindle 60, correspondingly.

It will be readily seen, therefore, that when the upper pawl 231 is in working position, the feed will be coarse, when this pawl is raised the feed will be fine, and when both pawls are removed from contact with the ratchet wheel, the feed will entirely cease. I prefer to provide suitable braking means, to prevent overthrow of the ratchet wheel 226, preferably consisting of a brake drum 249 fastened to the sleeve 224, a brake band 250, encircling the drum 249, a threaded rod 251 fastened to the brake band and passing through a rib of the bracket 219 and being provided above the rib with a compression spring 252 and an adjusting nut 253. (Figures 6, 7 and 10.)

*The automatic gaging and controlling mechanism.*

Referring first to Figures 14, 15 and 16, the hollow spindle 60 carrying the chuck 66, not shown in these figures, is provided with an internal concentric post 264 rigidly secured to the wall of the spindle, preferably by means of wings 265 embedded in tapered grooves 266 in the post 264 and attached to the inside surface of the spindle preferably by screws 267. A threaded portion 268 of the post projects below the wings 265 and a clamping nut 269 on the threaded portion is tightened to draw the posts downwards and force the tapered wings rigidly against the wall of the spindle 60. A sleeve 270 slidingly fits the post 264 and carries at its upper end preferably two gage pins 271 and 271[a] secured by set screws or pins 264[a] and having hard metal, glass or diamond gage points 272. The gage pins are preferably round in cross section and flat surfaces 271[b] are milled at each end to bear on the under side of the piece to be ground. (See also Figures 25 to 32.) Both ends 272 are preferably rounded, as shown in these figures, and the upper pin 271 is a minute fraction of an inch shorter than the lower pin 271[a]. A groove 273 is milled in the side of the post 264 opposite the gage points and a serpentine spring 274 is arranged in the groove 273 and tends to force the sleeve against the post 264, thus taking up any play that might develop between the sleeve and the post and assuring a positive gage measure at all times. The post 264 is provided with a longitudinal aperture 275 and a pin 276, into which is screwed a rod 277, is slidingly arranged in the aperture 275 and is held upwards against the closed upper end of the sleeve 270 by a long coiled compression spring 277[a] bearing with its lower end against the closed end of a pipe 278 that is screwed or otherwise secured in the post 264. When the rough tube 68 to be ground is inserted into the chuck 66 it is under size in internal diameter and the gage points 272 will not enter the tube but will bear against the inner edge thereof, impelled upwards by the coiled spring 277[a]. The pipe 278 extends downward through the spindle 60 and is secured at its lower end to the cap of an electrical switch box 279, preferably cylindrical in form, and provided at its upper and lower ends with enclosing caps 279[a]. Within the switch box are pairs of electrical adjustable contact points 280, 281 and 282 that are adapted to be contacted by a disc 283 on the rod 277, said rod extending loosely downwards through the pipe into the switch box. The rod 277 passes loosely through the contact disc 283 and carries a collar 284 above and a collar 285 below the disc and a coiled compression spring 286 is interposed between the upper collar 284 and the disc and a buffer spring 287 is preferably arranged between the lower collar 285 and the disc. The contact points 280, 281 and 282 are insulated from each other by suitable insulating material 288, and the contact points 281 are yieldingly arranged in sockets against springs 281[a] and are arranged below the points 282 (see Figure 33) for reasons which will hereinafter appear.

Electric battery wires 289 (see Figures 22 and 33 are connected to the contact points 280 and the disc 283 when in contact with said points completes a circuit A through a battery 290 and a magnet 291. Battery wires 292 run from the contact points 282 and an electric circuit B through the battery 290 and a magnet 293 is closed when the disc 283 bridges the points 282. The armatures 294 and 295 respectively for the magnets 291 and 293 are pivoted upon the clutch arm 153[a] and form latches for an actuating head 296, pivoted at 297 to the clutch arm, said head having locking shoulders 298 which the armature latches normally engage. A spring 299 is secured to the clutch arm at 300 (Figure 22) and the outer end of the spring is engaged in a slot 301 in the head 296 so disposed that in a normal neutral position of the spring, as shown in Figure 33, the actuating head is held in a middle position locked by both the latches 294 and 295 which are drawn against the head by a tension spring 302. The head 296 is in the path of the actuating trip blocks 156 and 157 and when said head is locked against rotation by both armature latches, as shown in Figures 1 and 33, the clutch lever 153 will be thrown alternately in opposite directions as the screw heads 163 of the trip blocks alternate in striking the projecting lug of the head during the travel of the carriage 86 and the carriage will be correspondingly reversed as heretofore described. When, however, one of the magnets 291 and 293 is energized by the closing of one of the circuits A or B, the corresponding armature latch will be withdrawn from its locking shoulder on the actuating head 296 and the head will turn on its pivot when engaged by the trip block, permitting said block to pass without moving the clutch lever to reverse the travel of the carriage 86 as indicated in Figure 22. This figure represents the relative position of the clutch controlling parts just after a piece of work has been finished and the carriage is in the act of passing from the lower grinding to the higher idling plane which permits of access to the work-holding chuck and a change of the work.

During the passage of the grinding wheel out of the finished piece of work to a higher plane, it is important for obvious reasons to prevent the feeding of the work-holding chuck when the wheel is at the feed point near the top of the piece passing upwards. As heretofore stated, it is also necessary to prevent the upper pawl 231 from operating the ratchet wheel 226 during the fine finishing feed. I prefer to accomplish both of these objects by removing by electrical means the actuating pawls for the feed out of engagement with the ratchet wheel 226 at the periods required, (see Figures 12 and 33 to 36). Upon the bracket 219 and insulated therefrom I arrange magnets 304 and 305, having armatures 306 and 307 respectively pivoted upon brackets 308 at 309. The armatures are provided with detents 310 and springs 311 hold the armatures in normal position against stops 312. The pawls 231 and 232 are provided with tail pieces 313 having pins 314 projecting under the detents 310. When the magnets are energized, the detents will engage the pins 314 and raise the pawls away from contact with the ratchet wheel, as indicated by dotted lines in Figure 12 and full lines in Figure 36 and when the magnets are again de-energized the springs 311 will raise the detents and permit the pawls to resume working contact with the ratchet wheel. Battery wires 315 are connected to the magnet 304 and complete an electrical circuit C to energize the magnet 304 through the battery 290 and contact points 281 when said points are contacted by the disc 283. Battery wires 316 are connected to the magnet 305 when the disc 283 contacts the points 282 and an electrical circuit D is completed through the battery 290 to energize the magnet 305.

In the operation of grinding, the work-piece to be ground is inserted in the chuck 66 after the grinding wheel has been raised to a higher level. The opening in the work-piece being less in diameter than the length of the gage pins, the gage sleeve 270 and rod 277 will be depressed by the insertion of the piece, thereby opening the electrical circuits B and C and closing circuit A in the switch box 279. This initial position is illustrated in Figure 34.

Referring now to Figures 14, 24 and 25, a stationary guard $85^b$ is rigidly fastened to the grinding wheel arbor housing $85^a$, preferably by means of a clamping bolt $85^c$. The guard partially encircles the wheel and is provided with a horizontal tongue $85^d$ projecting under the wheel 81. When the grinding wheel 81, during the grinding reaches its lowest position, as shown in Figure 14, the tongue $85^d$ of the guard $85^b$ will engage the upper end of the gage post sleeve 270 and further depress the rod 277 against the spring $277^a$ and 286. On the upward movement of the grinding wheel, the upper gage pin 271 will at first continue to be arrested against the under edge of the work-piece 68 until the internal diameter is large enough to admit this gage, when it will pass into the opening and the lower gage will similarly be arrested and stop the upward movements of the gage post until the lower gage pin can also pass into the work piece. I have found that a very slight and rapid vibratory action relatively of the gage pins and work-piece is a material aid to the free entering of the gage pins into the work-piece when the precise gage measurement has been attained. To illustrate this vibratory action, I have shown in Figure 24 a slight angular upper surface $270^a$ of the gage post 270 and a similar angular surface $85^e$ on the under side of the guard tongue $85^d$, the angularity of both surfaces, as shown, being greatly exaggerated. When the stationary guard tongue $85^d$ presses down on the rotating gage post the desired slight vibratory action is set up in the post to assist the gage pins in entering the work-piece freely when the wheel guard passes upwards. During the initial part of the grinding operation, the disc 283 will be depressed to contact the points 280 of the circuit A, as shown in Figures 14 and 33. This circuit is provided with yielding contact points 317 and an insulated circuit closer 318 is arranged preferably upon the adjustable idling trip block 319 on the lower part of the trip bar 128 (see Figures 1, 3, 33, 34 and 36). The circuit B is provided with similar contact points 320 adapted to be contacted by a circuit closer 321 upon the trip block 157.

During the entire grinding operation, both circuits A and B are open, the position of the circuit closers 318 and 321 being adjusted on the reciprocating trip bar 128 so that they can not close the circuits at this time by bridging the contact points 317 and 320. The actuating head 296 of the clutch lever 153 will therefore be held in a rigid position on the lever by latch armatures 294 and 295 and the clutch 152 will be actuated to alternately reverse the spindle carriage 86. During the first part of the grinding, the circuit C will also be open, as shown in Figures 33 and 34, permitting working engagement of the upper pawl 231 with the ratchet wheel 226 and the feed of the work-holding chuck will therefore be more rapid or coarse. When the grinding has proceeded to a point where the upper and shorter gage pin 271 passes into the work-piece, the contact disc 283 will pass upwards to the contact points 281 closing the circuit C, as illustrated in Figure 35. The pawl 231 will then be removed from working contact with the ratchet wheel 226 and this wheel will be rotated in a much shorter step movement, resulting in a finer feed for the final finish grinding. I prefer to provide means for retaining the pawl 231 in a raised position, independently of the electric circuit during the finish grinding and following idling period in order to lessen the work of the battery 290.

Referring to Figures 33 and 35, a latch arm 322 is pivoted to the frame of the magnet 304 or other suitable stationary part at 323 and normally rests on the projecting end of the magnet armature 306, held thereon by the tension of a spring 324. In the circuit C of the magnet 304 is interposed circuit breaking contact points 325 and a circuit closer 326 is arranged on the trip bar 128, preferably on the trip block 319. Only at the lower end or grinding positions of the arbor carriage 86 and trip bar 128 are the circuit breakers 325 spanned by the closer 326, as indicated in Figure 33, and when the circuit C is closed, as above described, as shown in Figures 35 and 36, the latch arm 322 will drop behind the armature lever 306. As the spindle carriage ascends, the circuit will be interrupted but the latch arm 322 will prevent the armature lever from returning and the pawl 231 will be held away from the ratchet wheel 226. The latch arm 322 is provided with a crank arm 322[a] and a cam 327 is carried by the trip bar 128, which in the idling position of the bar engages the crank arm 322[a] and raises the latch arm to permit the armature lever 306 to drop the pawl 231 to the ratchet wheel when the circuit C is broken by the contact disc 283, as shown in Figure 33. It will be seen, therefore, that the circuit C is only closed at the lower end positions of the spindle carriage during the fine feed finish grinding and open at all other times. This condition is illustrated in Figure 35, where the grinding wheel is shown moving upwards in the work-piece after leaving the gage post and the coarse feed pawl 231 is being held away from the ratchet wheel 226 by the latch arm 322. The fine feed grinding will then automatically proceed until the lower gage pin 271[a] also passes into the work-piece 68, as illustrated in Figures 22 and 36. The contact disc 283 will then have passed further upwards, compressing the springs 281[a] of the contact points 281 and make connection with the contact points 282. This connection closes the battery circuit D, energizing the magnet 305 and raises the fine feed pawl 232 from the ratchet wheel 226, preventing the feed movement when the grinding wheel comes to the feeding point at the top of the work-piece. Before this point is reached by the upward moving carriage 86 and trip bar 128, the electrical circuit B will have been closed by the circuit closer 321, as illustrated diagrammatically in Figure 22, and the carriage 86 will then pass on to the higher elevation illustrated in Figure 36.

From the above it will be noted that both the initial or coarse feed and the fine or finishing feed, as actuated by the cam blocks 240 and 241, will take place at both ends of the work-piece. When, however, the allowable limits of measurement, within which the finished work must be produced, is extremely close and great accuracy is required, it is desirable to omit the fine feed at the bottom of the work-piece and let the grinding whe l pass upwards in light contact with the internal surface of the work-piece, which operation is generally termed "tarry grinding," the wheel barely touching the ground surface of the work. For this purpose I provide means for automatically releasing the upper feed actuating block 241 when desired. Various means may be provided for this purpose, but I have shown in Figures 33 and 35 a depending cam arm 241[a] pivoted to an adjustable block 241[b] on the trip bar 128 at 328 and having a lug 329 against which the end of an armature arm 330 of a magnet 331 normally bears when the feed is desired at both ends, as shown in Figure 33, the armature arm being held against a stop 332 by a spring 333. The cam arm 241[a] is provided with the beveled cam surface 242 to engage the roller 239 of the feed lever 237 and the spring 244 normally holds the cam arm against a stop 243. The circuit wires 336 from the magnet 331 are connected to the circuit C, forming a circuit E and a switch 337 is arranged in the circuit E whereby the circuit may be held open or closed, as desired. When the switch 337 is open, as shown in Figure 33, the fine feed will be operated at both ends of the work-piece, and when the switch is closed, as indicated in Figure 35, the fine feed will be tarried and operated at the top of the work-piece only. The upward travel of the grinding wheel through the work-piece will then be transformed into tarry grinding and will result in extremely close gage measurements. When the work-piece has been finished and the carriage and grinding wheel has automatically been transferred to a higher level, as heretofore described, the finished piece is removed from the chuck 66 and the feed saddle 59 is returned to the initial position by turning the hand wheel 220. A new piece is then inserted and fastened in the chuck and when the switch 338 is closed, the grinding wheel will descend into the work-piece. At the beginning of the grinding, the set up of the grinding wheel to the work may be adjusted to a very minute degree by the operator turning the worm 222 by the knurled finger grip 223 which operation turns the shaft 217 and feed screw 200 independently of the sleeve 224 to which the actuating ratchet wheel 226 is secured.

A hand wheel 135[a] is also preferably arranged on the shaft 135 whereby the grinding wheel carriage may be moved up or down and the chuck spindle rotated manually by the operator, if desired.

During the elevation of the grinding wheel to the higher plane, I prefer to stop the lateral feed of the chuck saddle by making the lower actuating cam block 240 of sufficient length to contact the roller 239 on the straight face of the cam block constantly in the upper position, as indicated in Figures 33 to 36.

It may be sometimes desirable to retain at will the carriage at the high elevation or idle position, even after the new work-piece has been inserted in the chuck 66. For this purpose, I introduce a suitable switch 338 in the battery circuit A by which the descent of the carriage to the lower working position may be controlled at will by the operator, if desired.

The electrical control of the grinding operations of the machine as actuated automatically in the switch or contact box 279, and controlled primarily by the gage mechanism, enables me through flexible wire connections to the switch box to conveniently swing the work-holding chuck and spindle to any desired angle for the purpose of grinding conical internal surfaces. This feature of the invention is illustrated in Figure 37, where the work-holding chuck and spindle are shown at an angle of about thirty degrees to the grinding arbor. The chuck saddle 59 is then swung either to the right or left, according to the direction of the feed, to bring the grinding wheel in the proper position and the work piece is fed against the wheel, as for straight cylindrical grinding.

The chuck for holding the work-piece 339 may be of any suitable construction, as for parallel work, as shown, or may be modified to suit the particular form of the piece to be ground conically. The gage pin or pins 271 rest against the small hole end of the piece and when the hole is enlarged sufficiently, the gage passes into the work piece and the automatic electrical control operates exactly as for straight cylindrical work. It is of vital importance for accurate work to have the gage post exactly concentric to the chuck-carrying spindle and I am enabled with this machine to grind the post to an exact parallel and concentric position relative to the chuck-carrying spindle. This feature is illustrated in Figure 38. The chuck is removed from the spindle, which is mounted in its bearings 61 and 62, off-set eccentrically in relation to the grinding arbor and rotated as for grinding. The rotating post 264 is then fed against a grinding wheel 81 on the arbor 82, rotating at grinding speed until the upper portion of the post 264 is in precise concentric alignment with the spindle 60. It will readily be understood with reference to the drawings and from the foregoing description of the construction and operation of the automatic gage system embodied in this machine that the gage pins 271 and 271[a] being in constant contact with either the work-piece or wheel guard, will absorb through this contact the heat resulting from the grinding and that therefore substantially the same temperature will be maintained in the gage pins as in the work piece at any temperature resulting either from wet or dry grinding.

It will also be noted that with the vertical arrangement and novel construction of the hollow chuck carrying spindle, with the internally supported gage post, free and constant egress for water and dust from the grinding point is provided without coming in contact with any of the bearings. The water used in wet grinding will drop off from the lower end of the sleeve 270 and can not enter between the sleeve and gage post.

In case the novel automatic gage system here illustrated and described is applied to a grinding machine of the horizontal type as indicated in Figure 39, the sleeve 270 is preferably provided with a stuffing nut 342 to prevent water or dust from entering between the sleeve and gage post 264. The construction of the hollow spindle is otherwise identical, as in the vertical machine, and water with grinding refuse would escape similarly through the open end 343 of the spindle.

While I have illustrated the gage pins 271 and 271[a] of the preferred form, as above described, it is evident that various modifications of the pins may be made within the scope of the invention. In Figures 26 to 31 inclusive, I have illustrated some of the modified gage pin forms and means of accurately holding the pins in position in the gage post.

Figure 28:
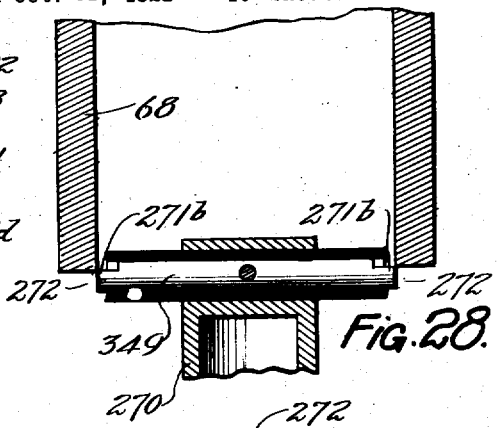
Figure 26:
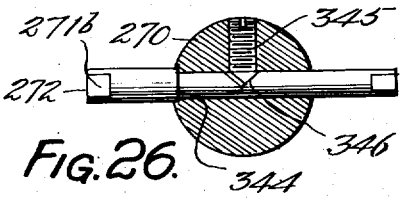
Figure 27:
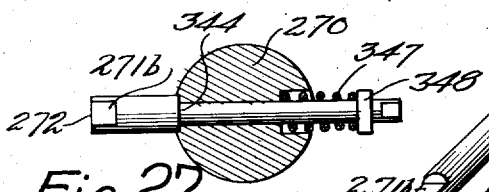

In Figures 26 and 27, the pin is shown provided with a shoulder 344 held against the post by a set screw 345 bearing against the forward side of a conical indentation 346 in Figure 26 and by a coil spring 347 tensioned against a collar or nut 348 in Figure 27. For work where close limits of the finished measurements are not required, the fine feed mechanism may be omitted and a single gage pin 349 substituted for the double gage, as shown in Figure 28.

I have shown and described a grinding device for operating on a tubular piece of work, but I do not confine myself to such use. Figure 38 illustrates how the grinding wheel may be utilized for operating on the surface of a solid body, such as a rod or shaft. In that case the lateral feed of the work-holder will be performed in the same manner, the meeting surfaces of the work and the grinding wheel being convex instead of concave, as in the case of a tubular piece of work. The gages would, of course, be modified in form or made circular to fit the end of a round rod or shaft instead of entering the open end of a tube.

Briefly, the operation of the machine is as follows: Assuming that the machine has been started and the grinding wheel is moving up and down in its idle position above the work, the operator will place a piece of work in the holder, allowing it to contact with the upper gage pin, as shown in Figure 34. This will have the effect, as heretofore described, of bringing the disc 283 in contact with the pins 280 and closing the circuit A in the switch box. The plate 296 will be released and the grinder will continue its down idle stroke to merge into the initial down-stroke of the working position.

As shown in Figure 33, the grinder reaches the limit of its downward working stroke and the contact 163 engages the plate 296 and throws the clutch, the circuit A having been broken between the contacts 317. This throwing of the clutch 152 starts the grinding wheel on its return working stroke and this continues until the lower contact 163 engages the plate 296 and throws the clutch in the other direction. This up and down movement of the grinding wheel in the work will continue with a coarse lateral feed of the work until the upper gage pin enters the work, when the feed will be automatically shifted from coarse to fine. This will continue until the lower gauge pin enters the work, when the circuit D and B will be closed and fine feed will be arrested and the grinder will start on its upstroke and out of the work.

In case tarry-grinding is desired at any time, the operator will close the switch 337 and fine feed will then only take place at the upper end of the stroke of the grinder, the feed at the lower end being eliminated. When the grinder reaches its idle position, it preferably is reciprocated in that position while the operator removes the finished piece of work and substitutes another piece.

By opening the switch 338, the operator may keep the grinding wheel reciprocating in its idle position until such time as he desires to resume the grinding operation.

In case the operator should desire a light cut in the work and render the coarse feed temporarily inactive, he may remove the upper gage pin and perform the grinding operation with the lower pin alone. This will result in utilizing only the fine lateral feed of the work and enable the user to make only a light cut on the internal surface of the work. The same result may be obtained by adjusting the curved shield 245 on the ratchet wheel 226 so that the pawl 232 can not contact with the ratchet teeth. Both the coarse and fine feed may be varied by adjusting the shields so that the actuating pawls will engage more or fewer ratchet teeth.

To maintain the highest efficiency and rapidity of the work, it is of special advantage especially where several grinding units are simultaneously operated, that the operator be made aware of the precise moment when the work piece is finished. I therefore arrange an electrically operated signal 353 (Figure 36) which may be either a light, a bell or other suitable signal, in the circuit B, so that when the work piece is finished and this circuit is closed and the grinding wheel is about to ascend to a higher plane, the operator will be made immediately aware of the fact. For convenience and safety I also prefer to arrange a permanent and positive stopping place for the carriage at the lowest extremity of its travel and independent of the screw shaft 111. For this purpose the screw threads are cut away on the screw 111 for some distance above the bearing 112 and a lug 354 (Figures 3, 4 and 6) is arranged to project from the frame 44. An adjustable screw 355 provided with a check nut is screwed into the lower end of the carriage 86, the head of which will contact with the lug 354, resting the carriage thereon when it is in its lowest position.

In Figure 29 a gage is shown comprising three shouldered pins 350 in the same plane and fastened to the gage post in any suitable manner, as by a press fit. Figures 30 and 31 show a circular or disc gage member 351 secured to the gage post preferably by being pressed on a tapered pin 352 of the post. This gage is used when grinding fluted or grooved surfaces, as indicated in Figure 30, and holes 351[a] may be provided in the disc for the passage of water. When grinding short articles, as illustrated in Figure 31[a], it is expedient to use a gage pin 357 having an upwardly offset gage end 358 in order to make sufficient clearance so that the grinding wheel will not pass out of the work-piece when the wheel is at the extremity of its upward travel when grinding. While I have generally shown the gage pins as gaging the work at both ends of the pins, it is evident that a single gage point at one end of the pins would accomplish equivalent results.

Many other details of construction of the device shown may obviously be modified in various particulars without exceeding the scope of the invention, and I do not, therefore, confine the claims of the invention to the particular details shown and described.

While the general wear of the grinding wheel is seen to be automatically compensated for by the feed mechanism of the machine, moving both the work-piece and gage pins toward the grinding wheel, occasionally relatively harder spots or sections exist or come to the surface as the grinding wheel wears off. The unequal hardness of grinding wheel ordinarily seriously interferes with the efficiency of the machine and the accuracy of the work turned out. To obviate this difficulty, I provide means to automatically reduce the high spots or sections of the grinding surface and preserve the wheel in a perfect circular form. These means consist of a small diamond or similar hard substance 360 (see Figure 37) arranged above the chuck 66 in a vertical plane with the grinding point of the grinding wheel and adjusted to a position so that when the revolving wheel passes upwards to and in the idling position and again downwards to the grinding position, the point of the diamond will remove any high and hard spots that may be present upon the grinding surface of the wheel. The body of the diamond is secured in a threaded pin 361 that is adjustably mounted in a sleeve 362. For reasons of general adaptability the sleeve 362 is supported adjustably in a bracket 363 and this bracket is secured to the feed saddle 59 so that the diamond point is constantly kept in the same vertical plane relative to the grinding point in the work-piece.

During the operation of the machine, it is at times desirable for the operator to be able to throw the lateral or "setting-up" feed out of action, while the grinding wheel is in the lower working position. For this purpose I provide a special electrical circuit F having connections with the magnets 304 and 305 and deriving energy from a battery 364. A circuit breaker provided with a hand switch 365 is arranged in the circuit F by which the working of the pawls 231 and 232 may be controlled and thrown in and out of operation to start and stop the feed at any time during the operation, as in Figure 36.

In the operation of grinding, particularly with a coarse feed, and using water or a grinding fluid, it is desirable to maintain the temperature of the gage pin as near as possible to the temperature of the work. Where the gage pin contacts at its end with the work and the water or grinding fluid passes by the pin rapidly, any heat transmitted from the work to the pin would be dissipated and to prevent this, I prefer to insulate the gage pin, as shown, with a suitable nonheat conductor, so that no heat will be transmitted from the pin to its support. When the gage is insulated in this way, it will expand during the wet grinding commensurate with the expansion of the work, the two parts maintaining a uniform ratio of expansion and contraction. Thus I am able to obtain a more accurate gage of the work. Both gage pins may be insulated from their support by any suitable nonheat conducting material.

In an internal grinding machine, the grinding wheel is necessarily of comparatively small diameter and the wear on said wheel is quite appreciable, and when a fixed stop is employed to regulate the completion of the grinding operation, such variation in the diameter of the wheel, due to wear, must necessarily cause variation and inaccuracies in the internal diameter of the work and necessitate hand feeding to complete the work. The use of my automatic gage entirely eliminates this objection, for regardless of the wear on the grinding wheel, the gage will automatically enter the work and check the grinding operation when the work has been ground to the predetermined finished diameter. The gage will also indicate to the operator that the hole has been ground to the finished size without repeatedly withdrawing the grinder from the work, causing bell-mouthing. This controlling device eliminates the fit and try processes of hand plugging, made necessary by wear on the grindstone, and allows a single operator to grind a plurality of pieces simultaneously within the minute limits or requirements of high class work.

I claim as my invention:

1. An internal grinding machine having means for internally grinding a piece of work the finished size automatically comprising means revoluble with the work and governed by the condition of the work as the grinding progresses for controlling the grinding operation.

2. In an internal grinding machine, a grinder and means contacting with the work and revoluble therewith and governed by the condition of the work as the grinding progresses for indicating to the operator when the hole has been ground to the finished size.

3. In an internal grinding machine, a grinder, a revoluble work-holder, and a gage pin normally outside the work but mounted to revolve with and governed by the condition of the work as the grinding progresses to enter the work and indicate to the operator the completion of the grinding operation to the finished size.

4. In an internal grinding machine, a revoluble grinder, a revoluble work holder, and spring-pressed controlling means normally outside the work and mounted to engage the work and enter therein upon the completion of the grinding operation to the finished size.

5. In an internal grinding machine, a grinder and means controlled by the size of the hole and arranged to enter the work when ground to the finished size for moving the grinder away from the work surface.

6. In an internal grinding machine, a grinder, a revoluble work holder positioned to support the work and receive said grinder, and a controlling means mounted to revolve outside and with the work and adapted to enter the work and separate the work and the grinder when the hole has reached the finished size.

7. An internal grinding machine comprising a grinder and a work-holder, mechanism for relatively reciprocating and feeding said grinder and work-holder, and means outside the work and permitted by the internal grinding operation to enter the work for effecting separation of said grinder and the work.

8. An internal grinding machine comprising a grinder and a work-holder, means for relatively reciprocating and feeding said grinder and work holder, and means outside the work and permitted by the internal grinding operation to enter the work axially for checking said feeding movement.

9. An internal grinding machine comprising a revolving work holder, a revolving grinder, said work holder and said grinder being mounted for relative reciprocation, a clutch for controlling the reciprocating movement of said grinder, and means for holding said grinder in its retracted position when the clutch is in neutral.

10. In an internal grinding machine, a gage for contact with the work incapable of entering the work until the grinding is finished, means for centering said gage with respect to the work, a grinder, and mechanism automatically made operative when said gage can enter the work for separating said grinder and the work.

11. In an internal grinding machine, a grinder, a pair of gages mounted to successively enter the work, and mechanism made operative by the entrance of the forward gage into the work for changing the feed and for checking the grinding operation when said second gage enters the work.

12. In an internal grinding machine, a grinder, a pair of transverse gage pins mounted to successively enter the work, and mechanism made operative by the entrance of the forward pin into the work for changing the feed and by the entrance of the rear pin into the work for checking the grinding operation.

13. In an internal grinding machine, a revoluble grinder, a revoluble work holder having means for securing the work, a revolving gage mounted to enter the work upon completion to the finished size, and mechanism automatically made operative by the entrance of said gage into the work for checking the grinding operation.

14. In an internal grinding machine, a work holder, a reciprocating grinder having an idle and a working position, and means incapable of entering the work until the grinding is finished but capable of so entering when the bore of the work has been enlarged to the finished size for checking the grinding operation.

15. In a grinding machine, a revoluble vertically arranged work holder, a revoluble vertically arranged grinder having an idle and a working position, means for moving said grinder vertically in such positions, and means made operative by the placing of a piece of work in said holder for continuing the down stroke of said grinder in its idle position to the initial down stroke of its working position.

16. In a grinding machine, a revoluble work holder, a revoluble grinder having an idle and a working position, means for reciprocating said grinder in its idle position, and in its working position within the work, and means for continuing the idle stroke of the grinder into the initial working stroke thereof.

17. In a grinding machine, a revoluble work holder, a revoluble grinder, a gage in the path of the work placed in said holder mounted to revolve therewith, an electric circuit closed by the movement of said gage through the pressure of the work thereon and mechanism made operative by the closing of said circuit for moving said grinder forward and backward on the surface of the work.

18. In a grinding machine, a revoluble work holder, a revoluble grinder having idle and working positions and means for reciprocating said grinder in such positions, a shifting clutch for said mechanism, electric circuits for controlling the operation of said clutch in said idle and working positions, and means actuated by the placing of the work in said holder for closing said work position circuit and temporarily rendering said clutch inactive to shift said grinder from its idle to its working position.

19. In a grinding machine, a revoluble work-holder, a revoluble grinder, mechanism for relatively feeding said work holder and said grinder laterally, said grinder having an idle and a working position, means made operative by placing of a piece of work in said holder for shifting the grinder from its idle to its working position, and means for changing the degree of feed of said work-holder when the work has been ground to a predetermined diameter.

20. In an internal grinding machine, a revoluble work holder, a revoluble grinder having an idle and working position and means for relatively feeding said work holder and grinder laterally, a gage positioned for contact with the work when it is placed in said holder, means actuated by the pressure of the work on said gage for shifting said grinder from its idle to its working position, and an electric circuit closed by the entrance of said gage into the work when it has been ground to a predetermined diameter for reducing such relative lateral feed.

21. In an internal grinding machine, a revoluble work holder, a revoluble grinder, a ratchet feed for relative lateral movement thereof, a revolving grinder, a gage in the path of a piece of work placed in said holder, mechanism having an electric circuit closed by the entrance of said gage into the work for changing the feed from coarse to fine, a second gage becoming operative when the work has been ground to the finished size, and a circuit made operative through the entrance of said second gage into the work for checking such relative feed.

22. In a grinding machine, a revoluble work holder, and a revoluble grinder having a relative forward and backward movement, a coarse and fine ratchet feed for relatively shifting said work holder and said grinder laterally, a coarse feed gage positioned opposite the work, mechanism made operative by pressure on said gage for shifting said grinder from its idle to its working position, a fine feed gage positioned for operation when a predetermined coarse cut has been made, and mechanism made operative by the movement of said fine feed gage into the work for checking the feed.

23. In an internal grinding machine, a revoluble work-holder, a revoluble grinder, means for relatively feeding said work holder and grinder laterally, means for relatively moving said holder and grinder forward and backward, and means for temporarily rendering said lateral feed inactive when said grinder is passing out of engagement with the work.

24. In an internal grinding machine, a revoluble work holder, a revoluble grinder mounted to operate forward and backward in the work, means for relatively feeding said work holder and grinder laterally at each end of the stroke of said grinder, and means for checking said lateral feed at one end of the work at a predetermined point in the grinding operation.

25. In a grinding machine, a revoluble work holder, a revoluble grinder, means for moving said grinder forward and backward on the surface of the work, means for relatively imparting a coarse or fine lateral feed to said holder and grinder at each end of the stroke of said grinder, means for shifting the feed from coarse to fine at a predetermined point in the progress of the work, and means for checking the fine feed at one end of the work and continuing such fine feed at the opposite end thereof.

26. In a grinding machine, a revoluble work-holder, adapted to support a tubular piece of work, a revoluble grinder, said holder and grinder being mounted for relative reciprocation, mechanism for relatively feeding said holder and grinder laterally and for changing the degree of said feed from coarse to fine, gages mounted one in front of the other for contact successively with the work, mechanism made operative by pressure on the forward gage for positioning said grinder and the piece of work and operating said feeding mechanism for a coarse feed, mechanism made operative by pressure on the rear gage for changing the feed from coarse to fine, and mechanism made operative by the entrance of the rear gage into the work for checking the fine feed.

27. In a grinding machine, a revoluble work-holder, adapted to support a tubular piece of work, a revoluble grinder, said holder and grinder mounted for relative movement forward and backward, mechanism for relatively feeding said holder and grinder laterally and for changing the degree of said feed, gages mounted one in front of the other for contact successively with the work, mechanism made operative by the engagement of the work with the forward gage for positioning said grinder and the work, and operating said feeding mechanism for a coarse feed, and mechanism made operative by the engagement of the rear gage with the work for changing the feed from coarse to fine.

28. In an internal grinding machine, a revoluble work-holder adapted to support a tubular piece of work, a revoluble grinder having an idle position outside the work and a working position within the work, means made operative by the placing of a piece of work in said holder for shifting said grinder from its idle to its working position, and means for automatically returning said grinder to its idle position when the work has been ground to the finished size.

29. In a grinding machine, a revoluble work holder, a revoluble grinder having an idle and a working position, mechanism for moving said grinder forward and backward in its working position, an electric circuit, and means associated therewith for controlling the movement of said grinder from its idle to its working position, mechanism actuated by the placing of the work in said holder for closing said circuit, and a switch in said circuit within control of the operator for regulating the initial movement of said grinder from its idle to its working position.

30. In an internal grinding machine, a revoluble work-holder having means for holding a piece of work, a grinder mounted to revolve within the work, and means revoluble with the work, and governed by the condition of the work as the grinding progresses for automatically controlling the grinding operation.

31. In an internal grinding machine, a revoluble work holder having means for holding a piece of work, a grinder mounted to revolve within the work, means for moving the grinder forward and backward during its revolving movement, means for relatively shifting said work holder and grinder laterally at the termination of the stroke of said grinder, and means revoluble with the work for automatically controlling the grinding operation to the predetermined finished diameter.

32. A grinding machine comprising a revoluble work holder having means for clamping a piece of work, a revoluble grinder, means for producing relative transverse movement between said work holder and grinder, and means for taking up the slack or lost motion in the transverse moving means.

33. A grinding machine comprising a revoluble work holder having means for holding a piece of work, a revoluble grinder, means for producing relative transverse movement between said work holder and grinder, said means including a feed screw and means for operating the same, and said feed screw having means for taking up the slack or lost motion in the movement thereof.

34. An internal grinding machine comprising a revoluble work holder having means for holding a piece of work, a saddle wherein said work holder is supported, a revoluble grinder, means for producing relative transverse movement between said saddle and grinder, and means for automatically controlling the grinding operation to the predetermined finished diameter.

35. An internal grinding machine comprising a revolving work holder having means for holding a piece of work, a revolving grinder, means for moving said grinder lengthwise of the work during its revolving operation, mechanism for changing the relative transverse position of the work holder and grinder at the termination of the stroke of said grinder lengthwise of the work, and means for automatically controlling the grinding operation to the predetermined finished diameter.

36. In an internal grinding machine, a work holder, a grinder mounted to operate automatically against the wall of a straight or tapered hole in the work, mechanism for automatically imparting an initial coarse relative feeding movement to said work holder and grinder, mechanism for arresting such movement automatically, mechanism for automatically imparting a subsequent finer relative feeding movement, and mechanism for automatically checking said finer feeding movement and withdrawing said grinder from the hole in the work when the surface has been ground the finished size.

37. In an internal grinding machine, a revoluble work holder and a revoluble grinder having a relative reciprocating movement for grinding the internal surface of the work in said holder, a controlling device opposed in the path of said grinder arranged to engage the work and check the grinding operations when the surface has been ground the finished size, and means for separating said controlling device and the work to allow freedom of movement of said grinder over the surface to be ground.

38. In an internal grinding machine, a revoluble work holder, a revoluble grinder mounted to operate within the work and against the inner surface thereof, means mounted to enter the work opposed to the grinder in its path through the work to indicate to the operator when the surface has been ground the finished size, and means for temporarily separating said indicating means and the work.

39. In an internal grinding machine, a work holder, a revoluble grinder mounted to grind the internal surface of the piece of work in said holder in combination with a controlling device mounted opposingly in the path of said grinder through the work to check the grinding operation when the work has been ground the finished size, and means for preventing contact of the grinder and said controlling device with each other when said grinder is operating at one end of the work.

40. In an internal grinding machine, a work holder and a revoluble grinder mounted for reciprocating movement with respect to each other, in combination with an indicating device opposed in the path of said grinder through the work for checking the grinding operations when the work has been ground the finished size, and means for preventing said indicating device and said grinder from contacting with each other during their reciprocating movement.

41. In an internal grinding machine, a revoluble work-holder, a revoluble grinder, said work holder and grinder being mounted to reciprocate relatively during the grinding operation, a controlling device opposed in the path of said grinder arranged to check the grinding operation when the surface has been ground the finished size, and means for moving said controlling device away from the work to allow freedom of longitudinal movement of said revolving grinder therein.

42. In an internal grinding machine, a work-holder, and a revoluble grinder, mounted for relative reciprocation, said grinder passing through the work at one end, in combination with an indicating device opposed to the grinder to check the grinding operation when the work has been ground the finished size, and a guard device for forcing said indicating device backward when said grinder emerges from the work at one end of their relative movement.

43. An internal grinding machine having in combination a rotary work holder, and a plurality of gages arranged to rotate therewith and to enter the work one behind the other.

44. A grinding machine having in combination a rotary work holder and a plurality of gages arranged to rotate therewith and to move axially into engagement with the work one behind the other.

45. A grinding machine having in combination a rotary work holder and a plurality of gages arranged to rotate therewith and to move parallel to the work surface which the grinder produces and into engagement with the work one in rear of the other.

46. An internal grinding machine having in combination a rotary work holder, a grinder and a plurality of gages mounted to enter the work one behind the other when ground the finished size, and having means for controlling the grinding operation.

47. A grinding machine having in combination a rotary work holder and a plurality of gages mounted concentrically one in the rear of the other for controlling the grinding operation.

48. A grinding machine having in combination a rotary work holder, a grinder mounted for relative movement with respect to said holder to enter one end of the work, and a grinder controlling gage mounted to enter the opposite end of the work.

49. A grinding machine having in combination a rotary work holder, a grinder having a relative movement with respect to said work holder to enter one end of the work, and a plurality of gages mounted to axially enter the opposite end of the work one in the rear of the other and check said grinder upon completion of the grinding operation.

50. A grinding machine having means for grinding a piece of work to the finished size automatically, comprising a grinder controlling gage moving intermittently automatically to abut the work until the reduction thereof permits movement of the gage thereon.

51. A grinding machine having, in combination, a rotary work holder and a gage movable for gaging the work and arranged to rotate therewith.

52. A grinding machine having, in combination, a rotary work holder, and a gage arranged to rotate therewith and to reciprocate relative thereto to gage the work.

53. An internal grinding machine having in combination, a work holder and a gage rotating on a common axis at the same speed, and means for causing periodic relative motion between the work holder and the gage along such axis to cause the gage to initially abut the work and to finally cause the entry of the gage into the bore when the bore has been ground to proper size.

54. A grinding machine having, in combination, a work holder, a gage, means for causing said holder and gage to rotate on a common axis at the same speed, and means for effecting relative approaching and receding movement between said holder and gage.

55. An internal grinding machine, having in combination, a grinding element, a work holder, a gage adapted to enter the bore of a piece of work in said holder only when said bore has been ground to a predetermined size, and grinder controlling means set in operation when the gage is inside such bore.

56. An internal grinding machine having in combination, a rotary work holder arranged to hold a piece of work having an internal bore, and means for automatically gaging the internal diameter of such bore comprising a gage element having a plurality of circumferentially spaced gaging devices arranged to rotate with the work and to enter one end of said bore only when the latter has been ground to size.

57. A grinding machine having the combination of a rotary work holder, a gage rotating at the same speed as and concentric with the work in said holder, and means for effecting relative reciprocation between the gage and the work along the axis of rotation of the work.

58. That method of gaging the internal diameter of a piece of work while being ground which consists in rotating the piece of work and the gage on a common axis at the same speed, and effecting a relative approaching and receding movement along such axis between the work and the gage to cause the gage to contact periodically with the end of the work and finally enter the bore of the work when ground to a predetermined size.

59. That method of gaging the internal diameter of a piece of work while being internally ground which comprises causing intermittent contact between the gage and the piece of work adjacent to the end of the bore by relative movement parallel to the grinding action whereby to effect the entrance of the gage into the bore of the work when the bore has been ground to predetermined size.

60. That method of gaging the internal diameter of a piece of work while being rotated and ground which comprises effecting a relative approaching and receding movement between the work on the one hand and a gage located outside the work on the other hand along the axis of rotation of the work, and causing intermittent contact of the gage with the end of the piece of work adjacent to the bore whereby to cause the entry of the gage into the bore when the bore has been ground to the desired size.

61. In the operation of internally grinding the bore of a piece of work wherein a holder for the work and a grinding wheel are longitudinally reciprocated and transversely fed with relation to each other, that method of gaging the internal diameter of the work which comprises rotating a gage on the same axis and at the same speed as the work, and effecting a relative reciprocation along the said axis between the work and a gage in synchronous relation to the relative reciprocation of the work and the grinding wheel, and causing limited initial contact between the gage and the end of the piece of work adjacent to the bore on each such reciprocation whereby to cause the entrance of the gage into the bore when the bore has been ground to a predetermined size.

62. That method of internal grinding which consists in rotating the grinder and the work, causing relative longitudinal reciprocation and relative transverse feeding movement between the grinder and the work, and effecting relative reciprocation between the work on the one hand and a gage rotating at the same speed as the work on the other hand, along the axis of rotation of the work, to cause the gage to initially contact with limited area of the end of the work in synchronized relation to the relative reciprocation between the grinder and the work, whereby to cause the gage to enter the bore of the work when the bore has been ground to predetermined diameter.

63. That method of gaging a piece of work while being ground which comprises effecting periodic contact of a gage with a part of the work located along one edge of the surface being ground, to cause the gage to slip over such edge and along the ground surface when said surface has been reduced the desired amount.

64. A grinding machine involving a grinder, a support for the work, means for causing relative movement between them, and a gage movable parallel to the grinding plane and arranged to engage and be stopped by a portion of the article to be ground which is to be removed but capable of moving over the ground surface when the grinding has progressed to the desired extent.

65. An internal grinding machine having, in combination, a work holder, a grinding wheel, means for effecting a relative working stroke reciprocation between said holder and wheel and also a relative transverse feeding movement therebetween, a gage arranged to contact with the work being ground, and means controlled by said gage and arranged to control said reciprocation to automatically effect withdrawal of the grinding wheel in the direction of such relative reciprocation from a position within the bore of the work to a position outside of the work and beyond the range of the working reciprocation when the work is ground to the desired size.

66. An internal grinding machine having, in combination, a work holder, a grinding wheel, means for effecting a relative working-stroke reciprocation between said holder and wheel and also a relative transverse feeding movement therebetween, a gage, an electric contact device arranged to be operated by said gage, an electro-magnet the circuit through which is controlled by said contact device, a dog controlled by said electro-magnet, and means governed by the position of said dog under the control of said gage and arranged to control said reciprocation to automatically effect withdrawal of said grinding wheel longitudinally out of the bore of the work and beyond the range of the working reciprocation.

67. A grinding machine having, in combination, a work holder, a gage arranged to coact with the work in said holder, a reciprocating carriage having a grinding wheel to operate on said work, said carriage having a working position in which it reciprocates and also an idle position remote from said working position, means for affecting a relative transverse movement between said work holder and said grinding wheel, and means for moving said reciprocatory carriage from said remote idle position to said working position, automatically reciprocating said carriage in said last mentioned position until the work has been ground to a predetermined point as determined by said gage, and then automatically returning said reciprocatory carriage to said idle position, said last mentioned movement being instituted by said gage.

68. A grinding machine having, in combination, a carriage having a work holder, a carriage having a grinder adapted to coact with the work in said holder, means for reciprocating said carriage including reversing dogs for reversing the movement of said last mentioned carriage while said grinder engages the work, a gage adapted to coact with the work in said holder, and means controlled by said gage for rendering said dogs ineffectual to limit the stroke of said carriage, so as to permit withdrawal of said grinder from the work automatically at the completion of the grinding operation.

69. A grinding machine having, in combination, a work-holder, a grinder, mechanism for reciprocating said workholder and grinder one relatively to the other in a working stroke, and means automatically operable when the occasion arises to cause the prolongation of the reciprocatory movement in one direction so as to position the grinder away from the work a substantial distance and beyond the range of said working stroke.

70. An internal grinding machine having, in combination, a workholder, a grinder, mechanism for reciprocating said workholder and grinder one relatively to the other while the grinder is in the bore of the work, and means automatically operable when the occasion arises to cause the prolongation of the reciprocating movement in one direction to position the grinder outside of the bore of the work and beyond the range of working reciprocation.

71. An internal grinding machine having, in combination, a workholder, a grinder, mechanism for reciprocating said workholder and grinder one relatively to the other while the grinder is in the bore of the work, and automatic means operable when the work has been ground to a predetermined size for automatically causing the reciprocating movement in one direction to be prolonged to position the grinder outside of the bore of the work and beyond the range of the relative working reciprocation of the grinder and the workholder.

72. A grinding machine having, in combination, a carriage having a work holder, a carriage having a grinding wheel, means for effecting a relative cross feed between said holder and said wheel, means for effecting a relative reciprocatory movement between said holder and said wheel, a gage, and means controlled by said gage and operable upon completion of the grinding operation to automatically allow a further movement of one of said carriages in the direction of their relative reciprocation into a remote inoperative position so as to separate widely the work holder and the grinding wheel.

73. A grinding machine having, in combination, a carriage having a work holder, a carriage having a grinding wheel coacting with the work in said holder, said last mentioned carriage having an operative position and a remote inoperative position, an operating mechanism for said last mentioned carriage, a reversing mechanism including a set of dogs for reciprocating said last mentioned carriage in operative position, an electromagnet for controlling one of said dogs, and a gage coacting with the work in said holder and controlling said electromagnet, said gage serving through said electro-magnet to render said dog ineffectual upon completion of the grinding operation.

74. A machine tool comprising, in combination, a carriage having a reciprocatory working position and an idle position remote therefrom, means for reciprocating said carriage in its working position, including a reversing device and a pair of dogs to engage and reverse said device, means automatically operable when the occasion arises to render one of said dogs ineffectual to limit the stroke of said carriage in its working position so as to permit withdrawal of said carriage from said working position to said remote idle position, and means for automatically engaging and operating said reversing device when the carriage reaches its idle or inoperative position.

75. A machine tool comprising, in combination, a carriage having a working position in which it reciprocates and an idle position remote from said working position, means for moving said carriage, a reversing device controlling said moving means and carrying a movable abutment, a pair of dogs arranged to engage said abutment to reverse said device and effect reciprocation of said carriage in its working position, said abutment being movable to permit one of said dogs to pass without operating said reversing device so as to allow the carriage to travel from its working to its idle position, and separate means to engage and operate said reversing device when said carriage is at its idle position.

76. A machine tool comprising, in combination, two parts, to-wit, a base and a sliding carriage, means for reciprocating said carriage including three members, two of which are mounted on one of said parts and the third one of which is mounted on the other one of said parts and is arranged to be alternately engaged by the said two members to effect reversal of the carriage-reciprocating means, and means automatically operable when the occasion arises for rendering one of said members ineffectual to cause such reversal so as to permit the carriage to continue its movement in the same direction.

77. A machine tool comprising, in combination, two parts, to-wit, a base and a sliding carriage, means for reciprocating said carriage including three members, two of which are mounted on one of said parts and the third one of which is mounted on the other one of said parts and is arranged to be alternately engaged by the said two members to effect reversal of the carriage-reciprocating means, a gage to coact with the work, and electro-magnetic means automatically operated by said gage for rendering one of said members ineffectual to cause reversal of said carriage so as to permit the carriage to continue its movement in one direction to a position remote from its reciprocating position.

78. A grinding machine comprising, in combination, a reciprocatory carriage, means for moving said carriage including a reversing device and control means to operate said reversing device including a set of coacting abutments and means automatically operable when the occasion arises to render said abutments ineffectual to limit the movement of said carriage in one direction thereby permitting a prolongation of travel of said carriage.

79. A machine tool having, in combination, a support for the work, a tool operable on the work, a gage supported adjacent to the work and movable parallel to the surface being reduced, said gage being arranged to engage and be stopped by a portion of the work which is to be removed but capable of moving over said surface when the latter has been reduced to the desired extent, and means insulating said gage from transmitting heat through its support.

80. A grinding machine having in combination a grinder, a support for the work, a tool operable on the work, and two gages supported adjacent to the work and movable parallel to the grinding plane and arranged to successively engage and be respectively stopped by different portions of the work which is to be removed, but capable of successively moving over the ground surface when the grinding away of said portions has successively progressed to a desired extent.

In witness whereof, I have hereunto set my hand this 30 day of December, 1924.

JOSEPH G. McDONOUGH.